US012536517B2

(12) United States Patent
Crabtree et al.

(10) Patent No.: US 12,536,517 B2
(45) Date of Patent: Jan. 27, 2026

(54) ARTIFICIAL INTELLIGENCE-POWERED MUSIC REGISTRY, COLLABORATION, AND WORKFLOW MANAGEMENT SYSTEM

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 79 days.

(21) Appl. No.: 18/679,404

(22) Filed: May 30, 2024

(65) Prior Publication Data

US 2025/0371511 A1    Dec. 4, 2025

(51) Int. Cl.
*G06Q 20/14* (2012.01)
*G06F 16/483* (2019.01)
*G06F 16/683* (2019.01)
*G06F 16/783* (2019.01)
*G06F 16/908* (2019.01)
*G06F 21/10* (2013.01)
*G06Q 10/101* (2023.01)
*G06Q 20/12* (2012.01)

(52) U.S. Cl.
CPC ........ *G06Q 20/145* (2013.01); *G06F 16/483* (2019.01); *G06F 16/683* (2019.01); *G06F 16/783* (2019.01); *G06F 16/908* (2019.01); *G06F 21/1015* (2023.08); *G06Q 10/101* (2013.01); *G06Q 20/1235* (2013.01); *G10H 2210/056* (2013.01); *G10H 2240/141* (2013.01); *G10H 2250/311* (2013.01)

(58) Field of Classification Search
CPC ................ G06Q 20/00–425; G16F 16/00–986
See application file for complete search history.

(56) References Cited

U.S. PATENT DOCUMENTS 11,218,409 B2 *    1/2022    Munson ................... H04L 9/083
2022/0398538 A1 * 12/2022    Jakobsson ............. H04L 9/3213

* cited by examiner

*Primary Examiner* — Mohammad A. Nilforoush
(74) *Attorney, Agent, or Firm* — Galvin Patent Law LLC; Brian R. Galvin

(57) ABSTRACT

An AI-powered music registry, collaboration, and workflow management platform that addresses the challenges faced by music industry participants in the digital age. The system comprises a segmentation and hashing subsystem for musical pieces, segments, and isolated elements, enabling the evaluation of uniqueness and the consideration of individual creators' contributions. An artificial intelligence (AI) and machine learning (ML) subsystem is employed for extracting and isolating individual instruments, vocals, and performer contributions, while a component-level tracking module enables enhanced crediting and royalty distribution.

36 Claims, 16 Drawing Sheets

ARTIFICIAL INTELLIGENCE-POWERED MUSIC REGISTRY, COLLABORATION, AND WORKFLOW MANAGEMENT SYSTEM

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of music production, and more particularly to a system and method for managing music composition, recording, production, creative rights, approvals, and royalty management using artificial intelligence and machine learning techniques.

Discussion of the State of the Art

The music industry has undergone significant changes in recent years, with the transition from physical to digital media and the proliferation of digital platforms. Musicians, composers, and producers face a multitude of challenges in this new landscape, including the fragmentation of ownership interests across various distribution channels, the increasing prevalence of digital sampling and generative artificial intelligence (AI) applications, and the need for more comprehensive tracking and management of creative rights, approvals, and royalties.

One of the primary issues is the lack of a unified system that adequately addresses the complexities of modern music composition, arrangement, and performance. Existing solutions often fail to consider the various elements that contribute to a musical work's commercial success and utility, such as individual performer contributions, lyrical content, and the broader cultural context in which the work is created and consumed. Additionally, current systems struggle to keep pace with the pervasive use of microsampling, sampling, and the incorporation of musical elements across diverse media, including videos, multimedia applications, and live events.

Another significant challenge is the limited ability of current systems to capture and analyze the nuances of individual artists' styles, influences, and contributions within a collaborative work. This limitation hinders the accurate attribution of credits and the equitable distribution of royalties among the various stakeholders involved in the creation and distribution of a musical piece. Furthermore, the lack of integration between musical content and the listeners' biometric and behavioral data prevents a deeper understanding of the emotional and psychological impact of music on audiences.

The music industry also faces difficulties in adapting to the rapidly evolving landscape of digital distribution and consumption. The proliferation of streaming platforms, social media, and user-generated content has created new opportunities for artists to reach audiences, but has also led to challenges in tracking usage, enforcing creative rights, and ensuring fair compensation for creators. Additionally, the increasing use of AI and machine learning (ML) in music generation and analysis has raised questions about the ownership and control of these technologies and their outputs.

What is needed is an innovative system that can address the complexities of the modern music industry. Such a system should provide a comprehensive and adaptable framework for managing music composition, recording, production, creative rights, approvals, and royalty distribution while leveraging the power of AI and ML to enhance the creative process and ensure fair compensation for all stakeholders involved.

SUMMARY OF THE INVENTION

Accordingly, the inventor has conceived and reduced to practice, an AI-powered music registry, collaboration, and workflow management platform that addresses the challenges faced by music industry participants. The system comprises a segmentation and hashing subsystem for musical pieces, segments, and isolated elements, enabling the evaluation of uniqueness and the consideration of individual creators' contributions. The platform also includes a licensing marketplace, royalty and residual calculator, and simulation engine to explore predicted virality scores and potential licensing and distribution opportunities.

According to a preferred embodiment, a computing system for managing digital content and associated rights employing an AI-powered content registry and collaboration platform is disclosed, the computing system comprising: one or more hardware processors configured for: receiving digital content comprising one or more files, metadata, and rights management information; parsing the digital content to isolate individual components using one or more artificial intelligence (AI) systems; generating unique identifiers for each isolated component by applying fingerprinting and hashing techniques; analyzing the digital content and its components using AI and machine learning techniques to extract features, characteristics, and contextual information; storing the digital content, isolated components, identifiers, and extracted information in a distributed database system; enabling collaboration among users by allowing them to contribute, modify, and interact with the digital content and its components; managing rights, licenses, and royalty distributions using smart contracts and blockchain technology; tracking usage, performance metrics, and revenue data for the digital content and its components; generating reports, insights, and recommendations based on the collected data and analytics; and providing a user interface for searching, discovering, and interacting with the digital content and its components within the content registry and collaboration platform.

According to another preferred embodiment, a computer-implemented method executed on an AI-powered content registry and collaboration platform for managing digital content and associated rights is disclosed, the computer-implemented method comprising: receiving digital content comprising one or more files, metadata, and rights management information; parsing the digital content to isolate individual components using one or more artificial intelligence (AI) systems; generating unique identifiers for each isolated component by applying fingerprinting and hashing techniques; analyzing the digital content and its components using AI and machine learning techniques to extract features, characteristics, and contextual information; storing the digital content, isolated components, identifiers, and extracted information in a distributed database system; enabling collaboration among users by allowing them to contribute, modify, and interact with the digital content and its components; managing rights, licenses, and royalty distributions using smart contracts and blockchain technology; tracking usage, performance metrics, and revenue data for the digital content and its components; generating reports, insights, and recommendations based on the collected data and analytics; and providing a user interface for searching, discovering, and interacting with the digital content and its components within the content registry and collaboration platform.

According to another preferred embodiment, a system for managing digital content and associated rights employing an AI-powered content registry and collaboration platform is disclosed, comprising one or more computers with executable instruction that, when executed, cause the system to: receive digital content comprising one or more files, metadata, and rights management information; parse the digital content to isolate individual components using one or more artificial intelligence (AI) systems; generate unique identifiers for each isolated component by applying fingerprinting and hashing techniques; analyze the digital content and its components using AI and machine learning techniques to extract features, characteristics, and contextual information; store the digital content, isolated components, identifiers, and extracted information in a distributed database system; enable collaboration among users by allowing them to contribute, modify, and interact with the digital content and its components; manage rights, licenses, and royalty distributions using smart contracts and blockchain technology; track usage, performance metrics, and revenue data for the digital content and its components; generate reports, insights, and recommendations based on the collected data and analytics; and provide a user interface for searching, discovering, and interacting with the digital content and its components within the content registry and collaboration platform.

According to another preferred embodiment, non-transitory, computer-readable storage media having computer executable instruction embodied thereon that, when executed by one or more processors of a computing system employing an AI-powered content registry and collaboration platform for managing digital content and associated rights, cause the computing system to: receive digital content comprising one or more files, metadata, and rights management information; parse the digital content to isolate individual components using one or more artificial intelligence (AI) systems; generate unique identifiers for each isolated component by applying fingerprinting and hashing techniques; analyze the digital content and its components using AI and machine learning techniques to extract features, characteristics, and contextual information; store the digital content, isolated components, identifiers, and extracted information in a distributed database system; enable collaboration among users by allowing them to contribute, modify, and interact with the digital content and its components; manage rights, licenses, and royalty distributions using smart contracts and blockchain technology; track usage, performance metrics, and revenue data for the digital content and its components; generate reports, insights, and recommendations based on the collected data and analytics; and provide a user interface for searching, discovering, and interacting with the digital content and its components within the content registry and collaboration platform.

According to an aspect of an embodiment, wherein the digital content comprises musical compositions, and the isolated components include instruments, vocals, and other elements of the musical compositions.

According to an aspect of an embodiment, wherein the AI systems used for parsing the digital content include convolutional neural networks (CNNs), recurrent neural networks (RNNs), and generative adversarial networks (GANs).

According to an aspect of an embodiment, wherein the fingerprinting and hashing techniques used for generating unique identifiers include audio fingerprinting algorithms and cryptographic hash functions.

According to an aspect of an embodiment, wherein the distributed database system comprises a combination of relational databases, NoSQL databases, vector databases, and graph databases.

According to an aspect of an embodiment, wherein the collaboration among users includes features such as commenting, version control, and real-time editing of the digital content and its components.

According to an aspect of an embodiment, wherein the smart contracts used for managing rights, licenses, and royalty distributions are executed on a blockchain network.

According to an aspect of an embodiment, wherein the tracking of usage, performance metrics, and revenue data is performed by integrating with various distribution channels and platforms.

According to an aspect of an embodiment, wherein the reports, insights, and recommendations generated by the system include data visualizations, trend analysis, and predictive analytics.

According to an aspect of an embodiment, wherein the user interface provides functionalities such as search, filtering, tagging, and personalized recommendations for exploring the digital content and its components.

BRIEF DESCRIPTION OF THE DRAWING FIGURES

DETAILED DESCRIPTION OF THE INVENTION

Figure 1:
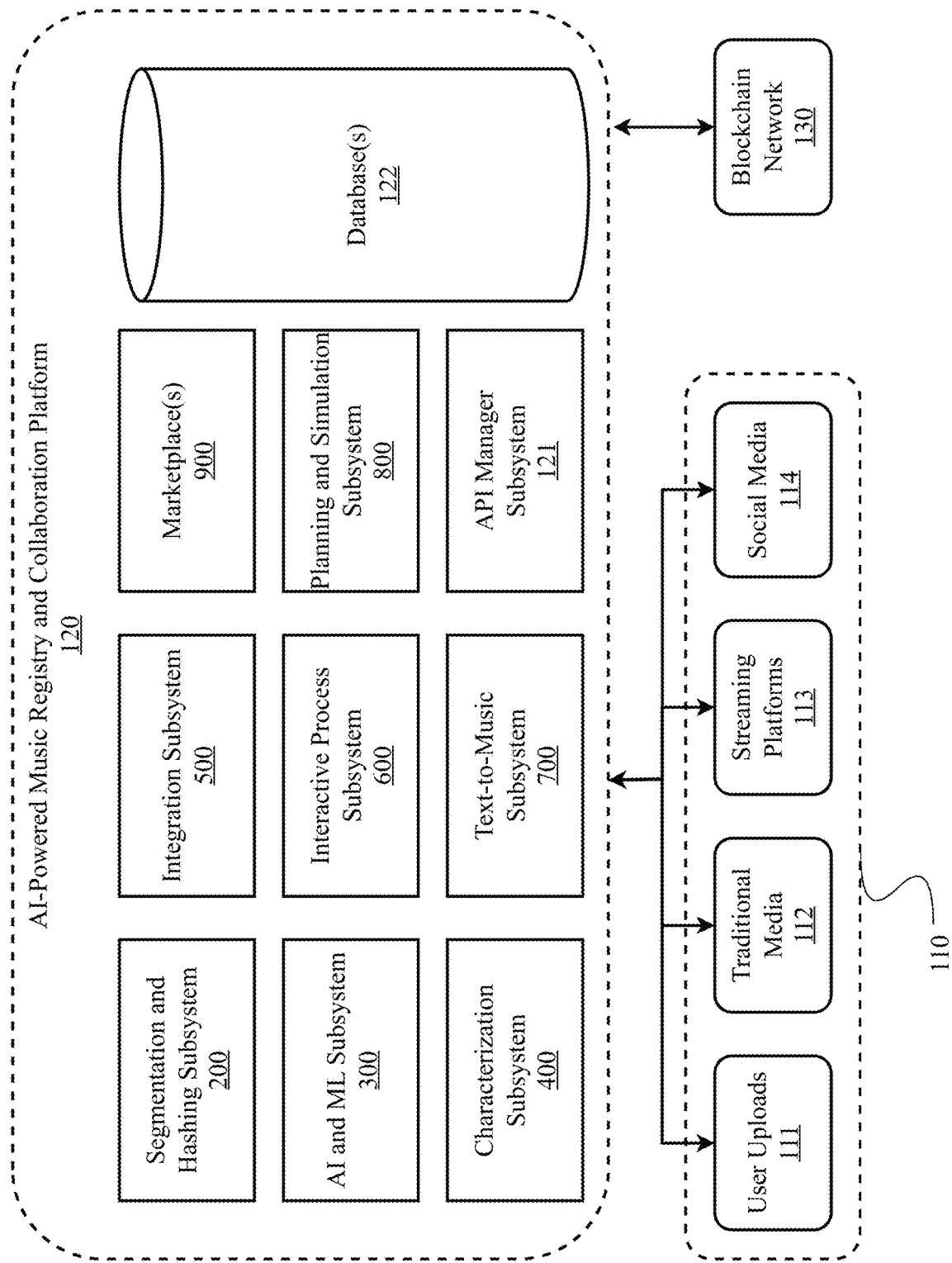
FIG. 1 is a block diagram illustrating an exemplary system architecture for artificial intelligence-powered music registry, collaboration, and workflow management system, according to an embodiment.

The inventor has conceived, and reduced to practice, an AI-powered music registry, collaboration, and workflow management system that addresses the challenges faced by music industry participants in the digital age. The system leverages segmentation and hashing for musical pieces, segments, and isolated elements, enabling the evaluation of uniqueness and the consideration of individual creators' contributions. An artificial intelligence (AI) and machine learning (ML) subsystem is employed for extracting and isolating individual instruments, vocals, and performer contributions, while a component-level tracking subsystem enables enhanced crediting and royalty distribution.

According to some embodiments, the system also includes a characterization subsystem for individual artists and their influences, which is used for AI/ML training and modeling. An integration subsystem may combine biometric and behavioral data to measure listener response to music in various contexts and states. A sampling and unique hashing subsystem generates unique hashes for song, album, artist, genre, and influence and distribution path comparisons and distance calculations.

In some embodiments, an interactive process subsystem can be configured to determine distance and similarity metrics between new and existing works, providing adjustments in the objective function/rating for specific components or the entire piece. An iterative optimization loop can generate optimal desired outcomes based on metrics automatically fed back into the music generation system. A text-to-music subsystem can incorporate temporal, spatial, contextual, name-image-likeness (NIL), mix, distribution medium, listening state, or other characteristics in the music generation process.

The system may also include an integration subsystem that incorporates planning, simulation modeling, statistical analysis, ML/AI tools, generative AI, suggestions of partnerships/ducts/collaborations, artist similarities, and copyright/other legal risks at the component, song, artist, and genre level into recording, ideation, mixing, and producing workflows. Additionally, the system may feature a licensing marketplace, royalty and residual calculator, and simulation engine to explore predicted virality scores and potential licensing and distribution opportunities, as well as a bid-type marketplace for artist collaborations and remixes.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB 8/13/1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships and node types. It is also important to note that the resource topologies available at a given execution time for a given pipeline may be highly dynamic due to changes in available node or edge types or topologies (e.g. different servers, data centers, devices, network links, etc.) being available, and this is even more so when legal, regulatory, privacy and security considerations are included in a DCG pipeline specification or recipe in the DSL. Since the system can have a range of parameters (e.g. authorized to do transformation x at compute locations of a, b, or c) the JIT, JIC, JIP elements can leverage system state information (about both the processing system and the observed system of interest) and planning or modeling modules to compute at least one parameter set (e.g. execution of pipeline may say based on current conditions use compute location b) at execution time. This may also be done at the highest level or delegated to lower level resources when considering the spectrum from centralized cloud clusters (i.e. higher) to extreme edge (e.g. a wearable, or phone or laptop). The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "pipeline," as used herein and interchangeably referred to as a "data pipeline" or a "processing pipeline," refers to a set of data streaming activities and batch activities. Streaming and batch activities can be connected indiscriminately within a pipeline and compute, transport or storage (including temporary in-memory persistence such as Kafka topics) may be optionally inferred/suggested by the system or may be expressly defined in the pipeline domain specific language. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, a certain data size or chunk, or optionally an internal (e.g. APM or trace or resource based trigger) or external trigger (e.g. from another user, pipeline, or exogenous service). The events are held in a queue (e.g. Kafka) or similar until processing. Each batch activity may contain a "source" data context (this may be a streaming context if the upstream activities are streaming), and a "destination" data context (which is passed to the next activity). Streaming activities may sometimes have an optional "destination" streaming data context (optional meaning: caching/persistence of events vs. ephemeral). System also contains a database containing all data pipelines as templates, recipes, or as run at execution time to enable post-hoc reconstruction or re-evaluation with a modified topology of the resources (e.g. compute, transport or storage), transformations, or data involved.

Conceptual Architecture

FIG. 1 is a block diagram illustrating an exemplary system architecture for artificial intelligence-powered music registry, collaboration, and workflow management system 120, according to an embodiment. According to the embodiment, system 120 is configured as a cloud-based computing platform comprising various system or sub-system components configured to provide functionality directed to the execution of managing music composition, recording, production, creative rights, approvals, and royalty management using artificial intelligence and machine learning techniques. Exemplary platform systems can include a segmentation and hashing subsystem 200, an artificial intelligence and machine learning (AI/ML) subsystem 300, a characterization subsystem 400, an integration subsystem 500, an interactive process subsystem 600, a text-to-music subsystem 700, a planning and simulation subsystem 800, a marketplace subsystem 900, an application programming interface (API) subsystem 121, and various databases 122. In some embodiments, subsystems 200-900 may each be implemented as standalone software applications or as a services/microservices architecture which can be deployed (via platform 120) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

The system 120 employs advanced AI/ML techniques, such as neural networks and specially-tuned models, to analyze musical pieces and isolate individual instruments, vocals, and performer contributions. For example, the system can separate the guitar, bass, drums, and vocals from a recorded song, allowing for a more granular analysis of each component and the ability to attribute credits and royalties to the respective contributors.

By isolating and tracking individual components of a musical piece, the system 120 enables more accurate and fair distribution of credits and royalties. This is particularly relevant in cases where a specific instrument or vocal performance is sampled or used in a new work. The system can identify the original contributor and ensure they are properly compensated for their contribution.

Component-level tracking is provided by the AI-powered music registry and collaboration system 120, as it enables more accurate and fair attribution of credits and royalties to the various contributors involved in creating a musical work. By isolating and tracking individual components, such as instruments, vocals, or samples, the system can ensure that each contributor is properly recognized and compensated for their work.

According to the embodiment, the system employs advanced metadata tagging techniques to label and categorize individual musical components. Each component is associated with relevant information, such as the contributor's name, their role (e.g., composer, lyricist, performer), the time stamp within the overall composition, and the specific instrument or vocal part. This granular tagging allows for a detailed breakdown of the musical work and facilitates the accurate tracking of each component. In a collaboratively produced hip-hop track, for example, the system can tag the individual components, such as the drum beat (produced by Artist A), the bass line (performed by Artist B), the piano riff (composed by Artist C), and the vocal verses (written and performed by Artist D). This detailed tagging ensures that each contributor is properly credited and compensated for their specific contribution.

In some implementations, the system can integrate with blockchain technology 130 and smart contracts to automate the distribution of credits and royalties based on the component-level tracking. Smart contracts are self-executing contracts with the terms of the agreement directly written into code. They can be programmed to automatically allocate royalties to the respective contributors based on predefined split percentages or other criteria. For example, using a smart contract, the system can automatically distribute royalties from the streaming revenue of a song to the various contributors based on their component-level contributions. For instance, if the drum beat producer is entitled to 5% of the royalties, the smart contract will ensure that they receive their share whenever the song generates revenue.

The system may be configured to provide real-time reporting and analytics on the usage and performance of individual musical components. This allows contributors to track how their work is being utilized and monetized across different platforms and media. The system can generate detailed breakdowns of royalty distributions, usage metrics, and audience engagement data, empowering contributors to make informed decisions about their creative work and collaborations. For instance, a vocalist featured in a popular electronic dance music (EDM) track can access real-time data on how often their vocal component is being streamed, remixed, or sampled across various platforms. They can also see their share of the royalties generated by the track and compare their performance to other collaborators or similar works in the genre.

Component-level tracking can help resolve disputes over ownership and attribution by providing a clear and verifiable record of each contributor's involvement in a musical work. The system can maintain a tamper-proof ledger of all contributions, modifications, and ownership transfers, ensuring transparency and accountability in the creative process. If, for example, a dispute arises between two artists claiming ownership of a specific guitar riff in a rock song, the system can refer to the component-level tracking data to determine who originally contributed the riff and when it was incorporated into the composition. This information can be used to resolve the dispute and ensure proper attribution and compensation.

The system can integrate with music licensing platforms 113 to facilitate the licensing of individual musical components for use in various projects, such as films, advertisements, or remixes. The component-level tracking allows for the granular licensing of specific elements, enabling creators to monetize their work in new and innovative ways. For example, a film producer can use the system to license only the orchestral arrangement of a popular song for use in their movie soundtrack, without having to license the entire original recording. The component-level tracking ensures that the composer and performers of the orchestral arrangement are properly credited and compensated for the usage of their work.

According to some embodiments, the system analyzes the unique styles, techniques, and influences of individual artists to create detailed profiles that can be used for AI/ML training and modeling. This allows for the generation of new content that accurately mimics the style of a particular artist or combines elements from multiple artists to create novel and innovative works.

By integrating biometric and behavioral data, such as heart rate, pupil dilation, and facial expressions, the system 120 can analyze the emotional and physiological responses of listeners to specific musical pieces or components. This information can be used to optimize the creation and selection of music for various contexts, such as advertising, film, or therapeutic applications.

The system 120 can be configured to generate unique hashes for each musical component, allowing for quick and accurate comparisons between songs, albums, artists, genres, and distribution paths. This enables the identification of similarities, influences, and potential copyright infringement issues, as well as the tracking of how musical elements are used and shared across different platforms and media.

The system 120 provides interactive tools for comparing new musical works to existing ones, calculating distance and similarity metrics based on various factors such as melody, harmony, rhythm, and lyrical content.

By continuously analyzing user engagement, biometric data, and other relevant metrics, the system 120 can provide real-time feedback and suggestions to optimize the creative process. This iterative loop allows artists and producers to refine their work based on audience reception and commercial performance, ultimately leading to more successful outcomes.

The system's text-to-music subsystem 700 allows users to generate musical pieces based on textual input, taking into account various characteristics such as mood, genre, tempo, and instrumentation. This enables the creation of custom music for specific contexts, such as film scenes, video games, or marketing campaigns, while ensuring the generated content aligns with the desired emotional and aesthetic goals.

In some implementations, the system 120 integrates with planning and simulation tools to help artists and producers make informed decisions about collaborations, distribution strategies, and marketing efforts. By analyzing market trends, audience preferences, and competitor performance, the system can provide data-driven recommendations to optimize resource allocation and maximize the success of a musical project.

The system's AI/ML capabilities allow for the suggestion of novel sounds, the generation of backing tracks, and the exploration of innovative sonic combinations. By analyzing vast databases of musical content and user preferences, the system can propose unique instrumentation, arrangement, and production ideas that push the boundaries of creativity and help artists differentiate themselves in a crowded market.

According to the embodiment, the system's architecture combines traditional SQL databases for structured data, knowledge graphs for modeling relationships between musical entities, and vector databases for efficient similarity searches and recommendations. This hybrid approach allows for the seamless integration of various data types and enables powerful querying and analysis capabilities. By leveraging a combination of databases 122, knowledge graphs, and vector databases, the system can support complex queries, discover meaningful relationships, and enable advanced machine learning applications.

Relational databases, such as MySQL or PostgreSQL, form the foundation of the system's data storage. They are used to store structured data related to artists, songs, albums, genres, licenses, collaboration data (e.g., user collaborations, roles and permissions associated with each musical piece), and analytics and reporting data (e.g., aggregated usage metrics, revenue data, and performance statistics), and other metadata. Relational databases may also be used to store user information such as user profiles, authentication credentials, roles, and permissions. The relational model allows for efficient querying, indexing, and enforcing data integrity through ACID (Atomicity, Consistency, Isolation, Durability) properties. The system can use a relational database, for example, to store information about a song, including (but not limited to) its title, artist, album, release date, duration, and genre. This structured data can be easily queried and filtered, enabling users to search for specific songs, artists, or albums based on various criteria. The relational database also ensures data consistency and prevents duplication or inconsistencies in the stored information.

NoSQL databases, such as MongoDB or Cassandra, may be used to store and manage unstructured or semi-structured data. Examples of the types of data that may be stored in such databases can include, but are not limited to, audio files, waveform data, metadata attachments (e.g., lyrics, liner notes, or user-generated tags), user activity logs (e.g., detailed logs of user actions, interactions, and events within the system), and collaborative content (e.g., user comments, feedback, and discussion threads related to musical pieces). These databases provide flexibility and scalability, allowing the system to handle large volumes of diverse data types, such as audio files, MIDI sequences, lyrics, and user-generated content. For example, the system can use a NoSQL database to store and manage audio files and their associated metadata. Each audio file can be stored as a document in the database, along with its ID3 tags, waveform data, and other relevant information. NoSQL databases enable the system to efficiently store and retrieve these files, regardless of their size or format, and allow for flexible querying and indexing based on the associated metadata.

Knowledge graphs may be used to represent and store complex relationships between musical entities, such as artists, songs, genres, and influences. They enable the system to capture and query the rich semantic connections that exist within the musical domain, facilitating advanced analysis and recommendation capabilities. Examples of the types of data that may be stored in such databases can include, but are not limited to, music knowledge graph (e.g., graph representation of the relationships and connections between musical entities, such as artists, songs, albums, genres, and influences), collaboration graph (e.g., graph depicting the collaborative relationships between users, including co-creation, remixing, and derivative work), sampling and reference graph (e.g., graph capturing the sampling, referencing, and inspiration relationships between musical pieces), music genealogy graph (e.g., graph representing the historical lineage and evolution of musical styles, genres, and influences), and artist connection graph (e.g., graph showcasing the connections and collaborations between artists, bands, and music producers). As an example, the system can use a knowledge graph to represent the relationships between artists and their musical influences. Each artist can be represented as a node in the graph, with edges connecting them to other artists who have influenced their work. This graph structure allows the system to traverse and query the relationships, enabling users to discover the musical lineage and connections between different artists. The knowledge graph can also capture other types of relationships, such as collaborations, remixes, and sampled works.

Vector databases, such as, for example, Faiss or Annoy, can be used to store and search high-dimensional vector representations of musical data. These vectors can be generated using machine learning techniques, such as audio embedding or feature extraction, and capture the salient characteristics of musical works in a compact and computationally efficient format. Examples of the types of data that may be stored in such databases can include, but are not limited to, audio embeddings (e.g., high-dimensional vector representations of musical pieces, generated using audio analysis and feature extraction techniques), similarity vectors (e.g., precomputed similarity scores or distances between musical pieces, used for efficient similarity search and recommendation), instrument embeddings (e.g., vector representations of individual instruments or vocal components, enabling similarity matching and retrieval), genre embeddings (e.g., vector representations of musical genres, allowing for genre classification and exploration), and mood embeddings (e.g., vector representations of emotional or mood characteristics of musical pieces). For instance, the system can use a vector database to store the audio embeddings of songs. These embeddings are generated by feeding the audio data through a deep learning model, which learns to capture the important features and patterns in the music. The resulting vectors can be stored in the vector database, enabling fast similarity searches and recommendations. When a user queries for songs similar to a given track, the system can quickly retrieve the most similar vectors from the database, providing accurate and relevant results.

In some embodiments, databases 122 may comprise and/or integrate with a blockchain database such as, for example, Ethereum or Hyperledger. Examples of the types of data that may be stored in such databases can include, but are not limited to, ownership records (e.g., immutable records of music ownership, including copyrights, licenses, and transfers), royalty distribution data (e.g., transparent and auditable records of royalty payments and distributions to rights holders), smart contracts (e.g., executable code that automates the enforcement of licensing terms, royalty calculations, and payments), provenance tracking (e.g., timestamped and immutable records of the creation, modification, and attribution history of musical pieces), and consensus data (e.g., transaction data and network consensus information related to the blockchain operations).

By combining relational databases, NoSQL databases, knowledge graphs, blockchain, and vector databases, the AI-powered music registry and collaboration platform 120 can efficiently store, manage, and analyze vast amounts of musical data. This system architecture enables complex querying, relationship discovery, and advanced machine learning applications, empowering artists, producers, and researchers to unlock new insights and creative possibilities in the world of music.

The system architecture may also include data pipelines and ETL (Extract, Transform, Load) processes to ingest, clean, and transform musical data from various sources. In some embodiments, a distributed computational graph (DCG) subsystem (please refer to FIGS. 10-11 for more information about the DCG) may be leveraged to dynamically manage data and compute pipelines. These pipelines ensure data quality, consistency, and compatibility across the different components of the system. The system can have a data pipeline, for instance, that ingests audio files from multiple sources, such as user uploads 111, record label catalogs 112, or music streaming services 113. The pipeline can apply audio preprocessing techniques, such as normalization, trimming, and format conversion, to ensure that the audio data is consistent and ready for further analysis. The transformed audio data can then be loaded into the appropriate databases (e.g., NoSQL for storage, vector database for embeddings) for efficient retrieval and processing.

The system architecture may further include an application programming interface (API) layer 121 that exposes the functionality and data of the music registry and collaboration platform 120 to external applications and services 110. This allows for seamless integration with other tools, platforms, and ecosystems in the music industry. For example, the system can provide a RESTful API that allows third-party applications to access and query the music database, retrieve song metadata, and perform similarity searches. This API can be used by music streaming services 113 to enhance their recommendation engines, by music production software to provide intelligent sample suggestions, social media servers 114 to access comments/likes/shares/etc., or by music analysis tools to access a vast library of musical data for research and experimentation.

The system includes a marketplace 900 where artists can bid on collaboration opportunities or the rights to remix existing works. This platform facilitates creative partnerships and allows emerging artists to gain exposure by working with established names in the industry. The marketplace also provides a transparent and efficient way to manage the legal and financial aspects of collaborations and remixes.

According to some embodiments, the system offers tools for adapting musical works to different formats, durations, and distribution channels. For example, a full-length song can be automatically edited into a shorter version for use in a commercial or social media post, while preserving the key elements that make it recognizable and engaging. This allows artists and rights holders to maximize the value of their content across multiple platforms and contexts.

CNNs are widely used for audio and music processing tasks, such as audio classification, genre recognition, and instrument detection. They are particularly effective at learning local patterns and hierarchical features from raw audio data. The system can use a CNN model to classify songs into different genres based on their audio features. The CNN can learn to identify the characteristic patterns and textures of each genre, such as the distorted guitars in rock music or the syncopated rhythms in funk. By training the CNN on a large dataset of labeled audio samples, the system can accurately predict the genre of new songs based on their audio content.

Recurrent Neural Networks (RNNs) and Long Short-Term Memory (LSTM) Networks may be implemented in some embodiments. RNNs and LSTMs are popular choices for modeling sequential data, such as time-series or musical sequences. They can capture the temporal dependencies and long-term context in music, making them suitable for tasks like melody generation, chord progression prediction, and audio transcription. The system may use an LSTM network to generate new melodies or continue an existing melodic sequence. By training the LSTM on a large corpus of MIDI data, it can learn the patterns, structures, and stylistic elements of different musical genres. Given a seed melody or a user-provided input, the LSTM can generate a coherent and musically plausible continuation, allowing users to explore new melodic ideas and variations.

Generative Adversarial Networks (GANs) are a class of generative models that can learn to create new data samples that are similar to the training data. In the context of music, GANs can be used for tasks such as audio synthesis, style transfer, and music generation. For example, the system may use a GAN to generate realistic-sounding drum patterns or rhythmic sequences. The GAN consists of two networks: a generator that produces new drum patterns and a discriminator that tries to distinguish between real and generated patterns. Through an adversarial training process, the generator learns to create drum patterns that are indistinguishable from real ones, allowing users to explore new rhythmic ideas and variations.

Variational Autoencoders (VAEs) are generative models that learn to encode input data into a lower-dimensional latent space and then decode it back to the original space. They can be used for tasks such as audio compression, denoising, and latent space exploration. The system can use a VAE, for example, to learn a compact representation of musical audio. By training the VAE on a large dataset of songs, it can learn to encode the essential features and characteristics of the audio into a lower-dimensional latent space. This latent representation can be used for similarity search, recommendation, or even interpolation between different songs to create new variations or blends.

Self-attention mechanisms and transformer architectures have revolutionized natural language processing and are increasingly being applied to music and audio tasks. They can capture long-range dependencies and learn complex relationships between different parts of a musical sequence. As an example, the system can use a transformer-based model to transcribe polyphonic music from audio to a symbolic representation, such as MIDI or sheet music. The transformer can learn to attend to different parts of the audio and capture the relationships between simultaneous notes and instruments. By training the model on a large dataset of aligned audio and symbolic data, it can accurately transcribe complex musical pieces, enabling users to analyze, edit, and manipulate the music in a symbolic format.

These are just a few examples of advanced machine learning algorithms that can be used in the AI-powered music registry and collaboration platform 120. The choice of algorithm depends on the specific task, data type, and desired outcome. By combining these algorithms with the system's architecture and data management capabilities, the platform can enable powerful and innovative applications in music analysis, generation, and collaboration.

Figure 2:
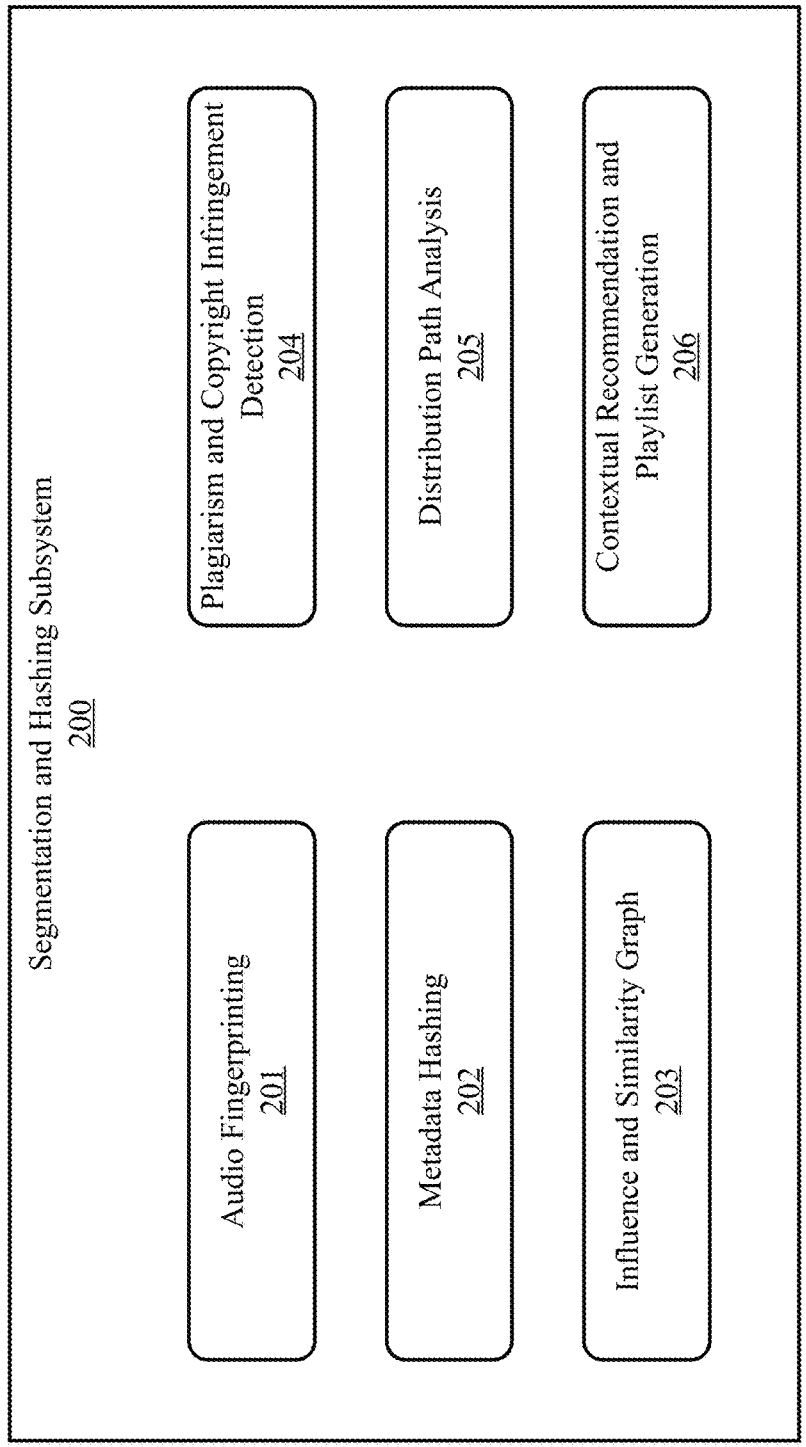
FIG. 2 is a block diagram illustrating an aspect of an artificial intelligence-powered music registry, collaboration, and workflow management system, a segmentation and hashing subsystem.

FIG. 2 is a block diagram illustrating an aspect of an artificial intelligence-powered music registry, collaboration, and workflow management system, a segmentation and hashing subsystem 200. According to the aspect, segmentation and hashing subsystem generates unique hashes for each musical component, allowing for quick and accurate comparisons between songs, albums, artists, genres, and distribution paths. This enables the identification of similarities, influences, and potential copyright infringement issues, as well as the tracking of how musical elements are used and shared across different platforms and media. According to the aspect, segmentation and hashing subsystem 200 comprises an audio fingerprinting component 201, a metadata hashing component 202, an influence and similarity graph component 203, a plagiarism and copyright infringement detection component 204, a distribution path analysis component 205, and a contextual recommendation and playlist generation component 206.

According to the aspect, the system employs advanced audio fingerprinting algorithms 201 to create unique hashes for each song, album, or musical component that a user uploads. These algorithms analyze the acoustic properties of the audio, such as spectral, temporal, and rhythmic features, to generate a compact and robust representation of the audio content. Examples of audio fingerprinting techniques that may be implemented include Shazam's algorithm, Philips' Robust Hash (PRH), and Fraunhofer's AudioID. As an example, when a new song is added to the music registry, the system generates a unique audio fingerprint based on its acoustic properties. This fingerprint can then be compared to the fingerprints of other songs in the database to identify potential matches or similarities.

In some embodiments, the system may implement advanced source separation techniques, such as Deep Extractor or Spleeter, to isolate individual instruments and vocals from a mixed audio track. These techniques leverage deep learning models trained on large datasets of isolated instrument and vocal recordings to accurately separate the different elements of a song. The output of the source separation process will be separate audio stems for each instrument (e.g., drums, bass, guitar) and vocals. The system may then apply audio fingerprinting algorithms, such as Shazam's fingerprinting or Chromaprint, to each isolated audio stem. These algorithms analyze the unique spectral and temporal characteristics of the audio and generate a compact and robust fingerprint that represents the essence of the sound. The fingerprints are typically represented as binary or hexadecimal strings, making them efficient for storage and comparison.

In some embodiments, segmentation and hashing subsystem 200 provides hashing and indexing mechanisms. System may hash the audio fingerprints using a secure cryptographic hash function, such as SHA-256 or MD5, or may utilize a neural network to create hash values. The hashing process converts the fingerprint into a fixed-size string of characters that uniquely identifies the audio content. System may store the hashed fingerprints in a database or an index, along with metadata such as the song title, artist name, and timestamp of the audio segment.

In addition to audio fingerprinting, the system can also be configured to create hashes based on the metadata associated with each musical entity, such as artist names, album titles, genre tags, and release dates. This metadata hashing 202 allows for quick and efficient comparisons of musical entities based on their textual attributes. In some implementations, the system can attach relevant metadata tags to each segmented and hashed audio element. The metadata can include information such as the instrument or vocal type, the performer's name, the role (e.g., lead vocals, backing vocals), and the time range within the original composition. This metadata enables precise crediting and attribution of each musical element to the respective contributors. For example, the system can generate a unique hash for each artist based on their name, discography, and biographical information. These hashes can be used to identify collaborations, influences, or similar artists within the music registry.

In some embodiments, the system may integrate the hashed audio fingerprints and metadata into a blockchain network, such as Ethereum or Hyperledger. The blockchain provides an immutable and transparent ledger for storing the ownership and licensing information associated with each musical element. Smart contracts may be used to automate the distribution of royalties based on the usage and licensing terms of each segmented component.

By comparing the audio fingerprints and metadata hashes of musical entities, the system can construct a comprehensive graph 203 that represents the relationships between songs, albums, artists, and genres based on their similarities and influences. This graph can be used to trace the evolution of musical styles, identify key influencers, and discover new connections between artists. For instance, the influence graph can reveal that a particular hip-hop track heavily samples a classic soul song from the 1970s. This connection can be used to attribute proper credit and royalties to the original artist and to understand the creative lineage of the new track.

The sampling and hashing techniques employed by the system can be used to detect potential cases of plagiarism or copyright infringement 204. By comparing the audio fingerprints and metadata hashes of new musical works to those in the registry, the system can identify suspicious similarities and flag them for further investigation. For instance, if a newly released song has an audio fingerprint that closely matches that of an existing song in the registry, the system can alert the copyright holders and initiate a process to determine whether infringement has occurred. This can help protect the rights of artists and ensure fair compensation for their work.

In some embodiments, the system may implement similarity matching algorithms to compare the hashed fingerprints of newly uploaded or streamed content against the existing database of fingerprints. Techniques such as locality-sensitive hashing (LSH) or nearest neighbor search can be used to efficiently find matching or similar audio segments. This enables the identification of sampled, covered, or remixed versions of the original musical elements, facilitating proper crediting and royalty distribution.

The system can also analyze the distribution paths 205 of musical entities by tracking how they spread across different platforms, media, and geographical regions. By comparing the distribution patterns of different songs or artists, the system can identify trends, measure popularity, and detect potential cases of unauthorized distribution or piracy. As an example, the system may compare the distribution paths of two similar songs to determine which one has achieved greater market penetration or to identify regions where one song may be more popular than the other. This information can be used to optimize marketing strategies, detect potential copyright infringement, and measure the overall success of a musical work.

The sampling and hashing techniques can be used to generate contextual recommendations and dynamic playlists 206 based on the similarities and influences between musical entities. By analyzing the relationships in the influence graph, the system can suggest songs, albums, genres, or artists that are likely to appeal to a user's tastes or complement their current listening context. For example, if a user is listening to a particular jazz album, the system can recommend other albums from the same era or style based on their audio fingerprints and metadata hashes. The system can also generate a playlist that explores the influences and descendants of that album, providing a rich and contextually relevant listening experience.

According to an embodiment, the system may generate detailed reports and analytics based on the usage and matching of the segmented and hashed musical elements. In such embodiments, the system can track metrics such as the number of plays, downloads, or streams for each component, as well as the geographical and demographic distribution of the audience. This can provide transparency and insights to musicians, producers, and rights holders regarding the performance and reach of their contributions.

By leveraging sampling and unique hashing techniques, AI-powered music registry and collaboration system 120 can create a robust and interconnected ecosystem that facilitates the discovery, attribution, and protection of musical works. This approach enables a deeper understanding of the complex relationships between musical entities and provides valuable tools for artists, labels, and music enthusiasts alike.

Figure 3:
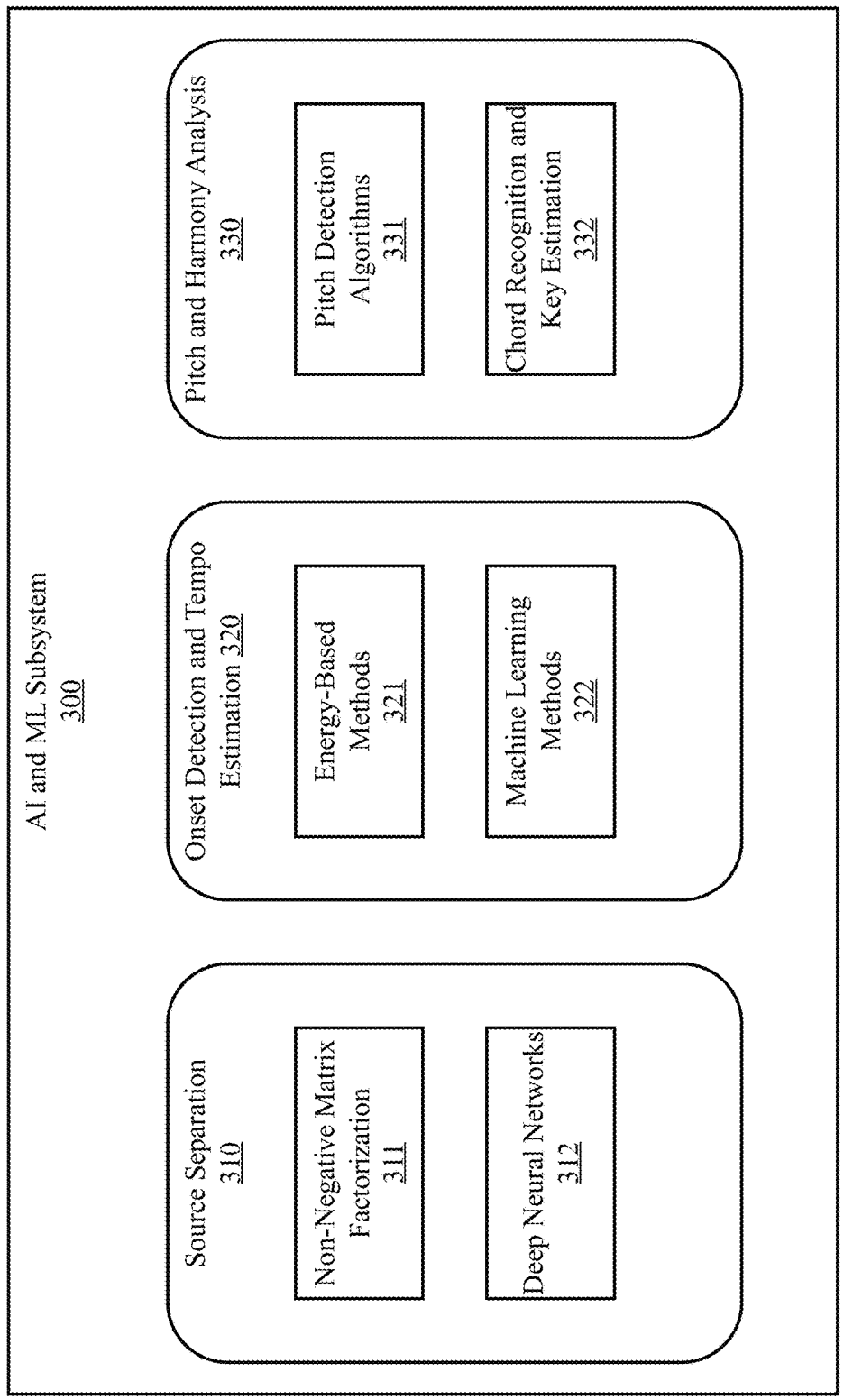
FIG. 3 is a block diagram illustrating an aspect of an artificial intelligence-powered music registry, collaboration, and workflow management system, an AI and ML subsystem.

FIG. 3 is a block diagram illustrating an aspect of an artificial intelligence-powered music registry, collaboration, and workflow management system, an AI and ML subsystem 300. According to the aspect, the subsystem 300 employs advanced AI/ML techniques, such as neural networks and specially-tuned models, to analyze musical pieces and isolate individual instruments, vocals, and performer contributions. According to the aspect, AI and ML subsystem 300 may comprises a source separation component 310, an onset detection component 320, and a pitch and harmony analysis component 330.

Source separation is a fundamental technique used to isolate individual instruments, vocals, and other components from a mixed audio signal. It involves using machine learning algorithms to analyze the spectral and temporal characteristics of the audio and identify the unique signatures of each component. According to the aspect, one approach utilizes non-negative matrix factorization (NMF) 311. NMF is a technique that decomposes an audio spectrogram into a set of non-negative basis functions and their corresponding activation coefficients. By training NMF models on isolated instrument recordings, the system can learn to identify and separate the individual components of a mixed audio signal. Another approach that may be implemented uses deep neural networks (DNNs) 312. DNNs, such as Convolutional Neural Networks (CNNs) and Recurrent Neural Networks (RNNs), have shown excellent performance in source separation tasks. These models can learn complex patterns and relationships in the audio data, allowing them to accurately identify and extract individual instruments and vocals. U-Net and Wave-U-Net are popular CNN architectures used for this purpose. As an example, the system can use a trained DNN to separate the vocals, guitar, bass, and drums from a mixed audio recording of a rock song, enabling the manipulation and analysis of each component independently.

Onset detection involves identifying the starting points of musical events, such as notes or percussive hits, within an audio signal. Tempo estimation refers to the process of determining the speed or pace of a musical piece. These techniques are important for accurately segmenting and aligning musical components. According to an aspect, onset detection utilizes energy-based methods 321. These methods rely on detecting sudden changes in the energy or amplitude of the audio signal, which often correspond to the onset of musical events. Techniques like spectral flux, high-frequency content, and phase deviation can be used for this purpose. Additionally, or alternatively, one or more machine learning (ML) methods 322 may be used to facilitate onset detection. ML models, such as DNNs or Support Vector Machines (SVMs), can be trained on labeled onset data to learn the patterns and characteristics of musical events. These models can then be used to detect onsets in new audio signals. For example, by accurately detecting the onsets of individual drum hits and estimating the tempo of a musical piece, the system can isolate and analyze the rhythmic components, enabling tasks such as beat matching, tempo synchronization, and groove analysis.

Pitch and harmony analysis 330 may involve identifying the fundamental frequencies and the relationships between different notes in a musical piece. This information is essential for tasks such as melody extraction, chord recognition, and key estimation. Some common techniques include pitch detection algorithms (PDAs) 331. PDAs, such as the YIN algorithm or the autocorrelation method, can be used to estimate the fundamental frequency of a monophonic audio signal. These algorithms analyze the periodicity of the waveform to determine the pitch of the dominant sound source. Chord recognition and key estimation 332 can also be implemented to support pitch and harmony analysis. ML models, such as Hidden Markov Models (HMMs) or DNNs, can be trained on labeled chord and key data to learn the patterns and relationships between different harmonies. These models can then be used to recognize chords and estimate the key of a musical piece based on the pitch and harmonic information. As an example, by analyzing the pitch and harmony of a vocal recording, the system can extract the melody, identify the underlying chord progressions, and estimate the key of the piece. This information can be used for tasks such as harmony-based similarity search, automatic accompaniment generation, and music transcription.

These are just a few examples of the AI/ML techniques that may be used for extracting and isolating individual music components. The field of Music Information Retrieval (MIR) is rapidly evolving, with researchers and practitioners constantly developing new and improved methods for analyzing and manipulating musical data which can be incorporated in registry and collaboration system 120.

Figure 4:
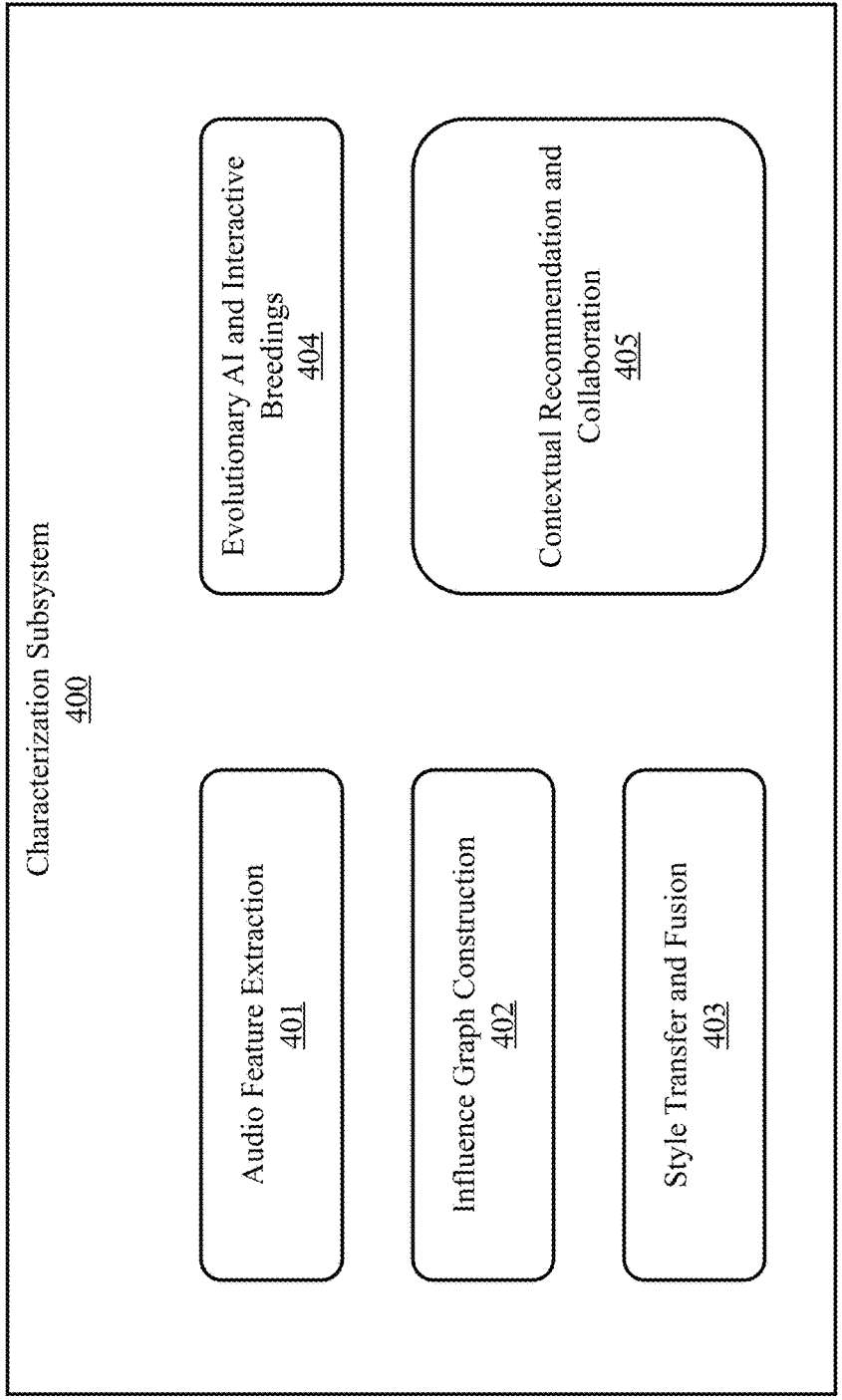
FIG. 4 is a block diagram illustrating an aspect of an artificial intelligence-powered music registry, collaboration, and workflow management system, a characterization subsystem.

FIG. 4 is a block diagram illustrating an aspect of an artificial intelligence-powered music registry, collaboration, and workflow management system, a characterization subsystem 400. According to the aspect, characterization subsystem 400 analyzes the unique styles, techniques, and influences of individual artists to create detailed profiles that can be used for AI/ML training and modeling. According to the aspect, characterization subsystem 400 comprises an audio feature extraction component 401, an influence graph construction component 402, a style transfer and fusion component 403, an evolutionary AI and interactive breeding component 404, and a contextual recommendation and collaboration component 405.

According to the embodiment, the system employs advanced audio feature extraction techniques 401 to analyze and characterize the musical style of individual artists. This may involve extracting a wide range of features, such as timbre, pitch, rhythm, harmony, and dynamics, from their recordings. These features serve as a unique fingerprint of the artist's sound and can be used to train AI/ML models to recognize and replicate their style. For example, by extracting audio features from a collection of guitar recordings by Jimi Hendrix, the system can learn the unique characteristics of his playing style, such as his use of distortion, feedback, and improvisation. These features can then be used to train an AI/ML model to generate new guitar riffs or solos that sound similar to Hendrix's style.

The system can construct an influence graph 402 that maps the relationships between artists based on their musical similarities and historical influences. This graph can be built using a combination of audio feature analysis, metadata (e.g., artist collaborations, genre tags), and expert human input. The influence graph provides a rich context for understanding an artist's style and how it relates to other artists and genres. As an example, the influence graph can show how the Beatles were influenced by artists like Chuck Berry and Little Richard, and how they, in turn, influenced later generations of rock and pop musicians. This information can be used to trace the evolution of musical styles and identify key influencers in different genres.

According to an embodiment, AI/ML models can be trained to perform style transfer 403, allowing the system to apply the characteristics of one artist's style to another artist's composition or performance. This enables the creation of novel and interesting musical combinations that blend the styles of different artists. Additionally, the system can use generative models to fuse elements from multiple artists, creating new and unique musical styles. For example, the system can use style transfer to apply the vocal characteristics of Freddie Mercury to a new pop song, making it sound as if Mercury himself were singing the track. Alternatively, the system can fuse the drumming style of John Bonham with the bass playing of Flea to create a unique and powerful rhythm section for a new rock composition.

According to the aspect, the system can employ evolutionary AI techniques 404, such as genetic algorithms or neuroevolution, to generate new musical content by combining and mutating the styles of different artists. This approach mimics the process of natural evolution, allowing the system to explore a vast space of potential musical combinations and select the most promising candidates based on fitness criteria, such as similarity to a target style or user preferences. For example, using evolutionary AI, the system can generate a population of new jazz compositions that combine the styles of Miles Davis, John Coltrane, and Herbie Hancock. The user can then interactively "breed" the compositions by selecting their favorite candidates, which are then used to generate the next generation of compositions, gradually evolving towards the user's desired style.

By characterizing individual artists and their influences, the system can provide contextual recommendations 405 for collaborations, remixes, or mashups. It can identify artists with complementary styles or shared influences, suggesting potential collaborations that could lead to innovative and exciting new music. The system can also recommend artists for users to discover based on their listening history and preferences. As an example, if a user frequently listens to both Kanye West and Daft Punk, the system can recommend a collaboration between the two artists, highlighting their shared influences in hip-hop and electronic music. The system can also suggest other artists in the same musical lineage, such as J Dilla or Justice, for the user to explore.

By leveraging AI/ML techniques to characterize individual artists and their influences, music registry and collaboration system 120 can unlock new creative possibilities and inspire innovative musical works. This approach allows for the preservation and celebration of diverse musical styles while also enabling the emergence of new and exciting musical frontiers.

Figure 5:
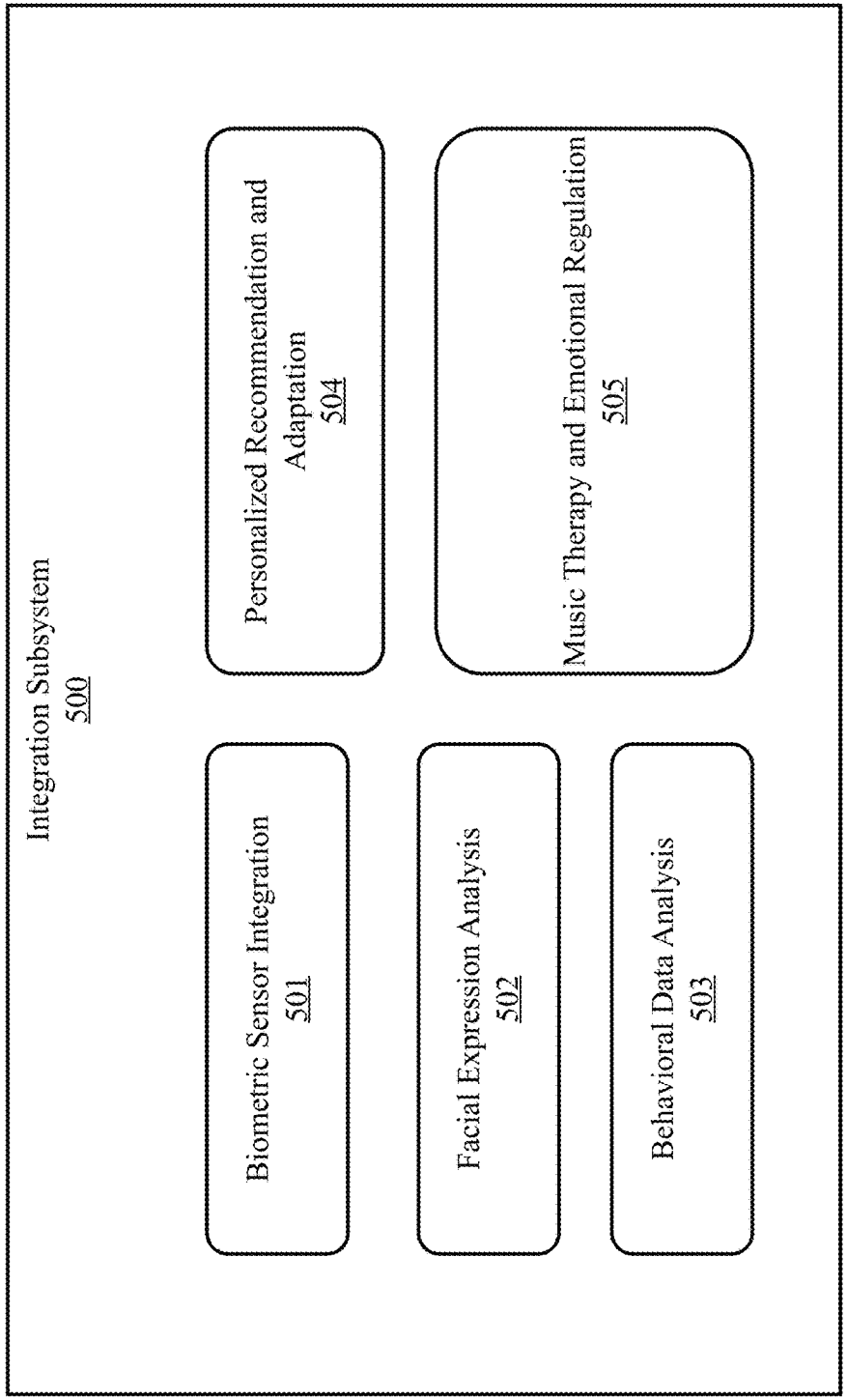
FIG. 5 is a block diagram illustrating an aspect of an artificial intelligence-powered music registry, collaboration, and workflow management system, an integration subsystem.

FIG. 5 is a block diagram illustrating an aspect of an artificial intelligence-powered music registry, collaboration, and workflow management system, an integration subsystem 500. According to the aspect, by integrating biometric and behavioral data, such as heart rate, pupil dilation, and facial expressions, the system can analyze the emotional and physiological responses of listeners to specific musical pieces or components. This information can be used to optimize the creation and selection of music for various contexts, such as advertising, film, or therapeutic applications. According to the aspect, integration subsystem 500 comprises an biometric sensor integration component 501, a facial expression analysis component 502, a behavioral data analysis component 503, a personalized recommendation and adaptation component 504, and a music therapy and emotional regulation component 505.

According to the aspect, the system can integrate with various biometric sensors, such as wearable devices (e.g., smartwatches, fitness trackers) or non-invasive monitoring systems (e.g., cameras, microphones) to collect real-time data on listeners' physiological responses to music. This data can include heart rate, skin conductance (a measure of emotional arousal), respiratory rate, and brain activity (through EEG or fMRI). As an example, during a live concert, the system can collect biometric data from a sample of the audience using wearable sensors. This data can be analyzed to determine which songs or specific musical moments elicit the strongest emotional responses, such as increased heart rate or skin conductance spikes during powerful crescendos or solos.

The system can use computer vision techniques to analyze listeners' facial expressions 502 and body language while they engage with music. By detecting emotions such as happiness, sadness, surprise, or excitement, the system can infer the emotional impact of specific musical passages or styles. For example, while a user listens to a playlist on a music streaming service, the system can use the device's camera to capture and analyze their facial expressions. This data can be used to create an emotional profile of the user's listening experience, identifying the tracks that evoke the most positive or intense emotional responses.

According to the aspect, the system can collect and analyze behavioral data 503 from music streaming platforms 113, social media 114, and other digital sources to understand how listeners interact with and share music. This data can include, for example, play counts, skip rates, playlist additions, likes, comments, and shares. By combining this behavioral data with biometric and emotional data, the system can gain a more comprehensive understanding of listener engagement and preferences. As an example, the system can analyze the behavioral data of a large sample of users who have listened to a particular album. By identifying the tracks with the highest play counts, lowest skip rates, and most social media shares, the system can infer which songs are the most popular and engaging. This data can be cross-referenced with biometric data to understand the physiological and emotional factors driving these preferences.

By integrating biometric and behavioral data, the system can provide personalized music recommendations 504 that are tailored to each listener's emotional state and preferences. The system can adapt playlists or suggest specific tracks based on the user's current mood or desired emotional outcome. For example, if a user's biometric data indicates that they are feeling stressed or anxious, the system can recommend a playlist of calming, relaxing tracks that have been shown to reduce stress in other listeners with similar profiles. As the user listens to the playlist, the system can continue to monitor their biometric data and adjust the recommendations, accordingly, ensuring an optimal listening experience.

The insights gained from integrating biometric and behavioral data can be applied to the development of music-based therapies and interventions for emotional regulation. By understanding how specific musical elements and styles influence listeners' emotions and physiology, the system can help create targeted interventions for conditions such as anxiety, depression, or sleep disorders. As an example, the system can analyze biometric data from a group of individuals with anxiety disorders to identify the musical characteristics that are most effective in reducing their symptoms. This information can be used to create a music therapy program that incorporates these elements, providing a non-pharmacological approach to managing anxiety.

Integrating biometric and behavioral data into the AI-powered music registry and collaboration system 120 opens up new possibilities for understanding and optimizing the emotional impact of music. By leveraging this data, the system can provide personalized experiences, inform music creation and curation, and support the development of music-based interventions for health and well-being. As our understanding of the complex relationship between music and emotion deepens, this integration will become increasingly valuable for artists, listeners, and the music industry as a whole.

Figure 6:
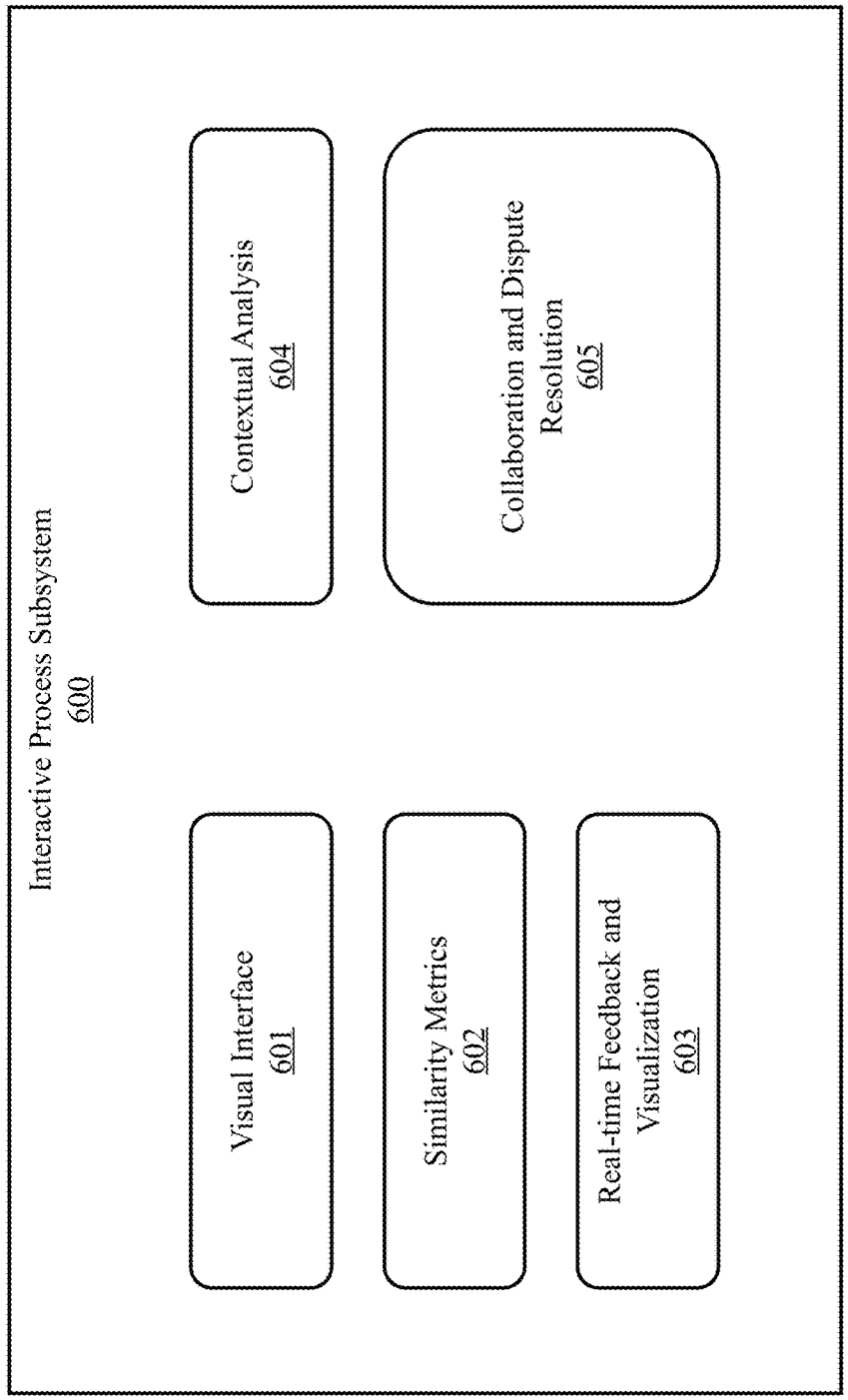
FIG. 6 is a block diagram illustrating an aspect of an artificial intelligence-powered music registry, collaboration, and workflow management system, an interactive process subsystem.

FIG. 6 is a block diagram illustrating an aspect of an artificial intelligence-powered music registry, collaboration, and workflow management system, an interactive process subsystem 600. According to the aspect, interactive process subsystem 600 provides interactive tools for comparing new musical works to existing ones, calculating distance and similarity metrics based on various factors such as melody, harmony, rhythm, and lyrical content. According to the aspect, interactive process subsystem 600 comprises a visual interface component 601, a similarity metrics component 602, a real-time feedback and visualization component 603, a contextual analysis component 604, and a collaboration and dispute resolution component 605.

According to the aspect, the system employs various similarity metrics 602 to quantify the distance or closeness between musical works. These metrics can be based on audio features, melodic and harmonic content, rhythmic patterns, or lyrical similarities. Some common similarity metrics which may be implemented include, but are not limited to: Euclidean distance which measures the straight-line distance between two feature vectors in a high-dimensional space; Cosine Similarity, which calculates the cosine of the angle between two feature vectors, indicating their similarity in terms of orientation; Dynamic Time Warping (DTW), which aligns two temporal sequences (e.g., melodies) and measures their similarity while allowing for local stretching or compression; edit distance, which quantifies the number of operations (insertions, deletions, or substitutions) required to transform one sequence into another. As an example, when a composer creates a new melody, the system can compare it to a database of existing melodies using DTW and compute a similarity score. If the similarity score exceeds a certain threshold, the system can alert the composer and suggest modifications to make the melody more distinctive.

The system can provide real-time feedback and visualization 603 of the similarity metrics as users create or modify musical works. This allows users to immediately see how their changes impact the originality of their work and make adjustments accordingly. The feedback can be presented through intuitive visual interfaces 601, such as color-coded similarity matrices, interactive graphs, or side-by-side comparisons. For example, as a producer is working on a new track, the system can continuously analyze the audio and provide a visual representation of its similarity to existing tracks in the database. The producer can use this feedback to identify potential copyright issues and iterate on the track until it achieves a satisfactory level of originality.

The interactive process allows users to iteratively refine their musical works based on the similarity feedback provided by the system. Users can experiment with different variations, make targeted modifications, and explore alternative creative directions to minimize the risk of copyright infringement while still maintaining their artistic vision. If a songwriter, for example, is notified that their lyrics are too similar to an existing song, they can use the system's suggestions and feedback to iteratively modify the lyrics, adjusting specific words, phrases, or rhyme schemes until the similarity scores fall within an acceptable range.

The system may be configured to take into account the context and genre of the musical works when calculating similarity metrics. This ensures that the comparisons are meaningful and relevant within the specific musical domain. The system can also consider factors such as the popularity, cultural significance, and historical context of existing works to provide more nuanced guidance to users. For example, when analyzing the similarity of a new hip-hop track to existing works, the system can focus on elements that are particularly important in that genre, such as the beat, flow, and lyrical content. The system can also consider the influence and popularity of existing tracks to help the artist understand the potential impact of any similarities.

The interactive process subsystem 600 can facilitate collaboration between multiple stakeholders, such as composers, lyricists, and producers, by providing a shared platform for evaluating and refining musical works. In case of disputes or conflicting opinions, the system can provide objective metrics and evidence to support decision-making and help resolve any issues. As an example, if a composer and a lyricist disagree on whether a particular section of a song is too similar to an existing work, they can use the system's similarity metrics and visual feedback to have a data-driven discussion and reach a consensus on how to proceed.

By incorporating interactive processes for determining distance and similarity metrics, the AI-powered music registry and collaboration system 120 empowers users to create original and distinctive musical works while minimizing the risk of copyright infringement. These processes foster creativity, collaboration, and responsible artistic practices, ultimately benefiting the entire music ecosystem.

Figure 7:
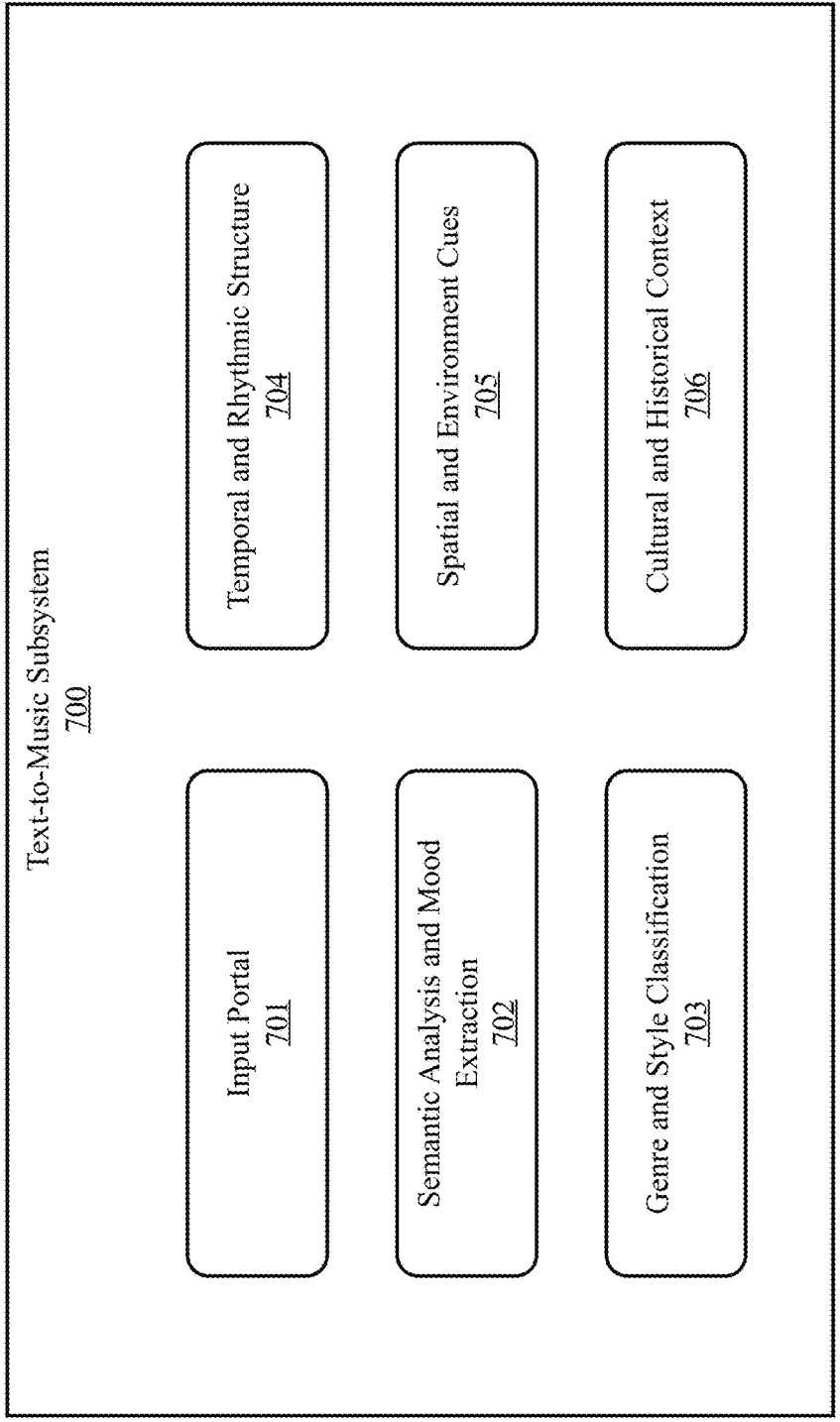
FIG. 7 is a block diagram illustrating an aspect of an artificial intelligence-powered music registry, collaboration, and workflow management system, a text-to-music subsystem.

FIG. 7 is a block diagram illustrating an aspect of an artificial intelligence-powered music registry, collaboration, and workflow management system, a text-to-music subsystem 700. According to the aspect, text-to-music subsystem 700 allows users to generate musical compositions or elements based on textual input, taking into account various characteristics such as mood, genre, tempo, instrumentation, and cultural context. This enables the creation of custom music for specific contexts, such as film scenes, video games, or marketing campaigns, while ensuring the generated content aligns with the desired emotional and aesthetic goals. By leveraging advanced natural language processing (NLP) and deep learning techniques, the system can interpret and translate textual descriptions into meaningful musical representations. According to the aspect, text-to-music subsystem 700 comprises an input portal 701, a semantic analysis and mood extraction component bb702b, a genre and style classification component 703, a temporal and rhythmic structure component 704, a spatial and environment cues component 705, and a cultural and historical context component 706.

Text-to-music subsystem 700 may implement an input portal 701 wherein a system user can input a textual description/prompt of a musical composition or element they wish to generate.

According to the aspect, the system may use NLP techniques, such as sentiment analysis and emotion detection, to extract the underlying mood and emotional intent from the input text. This allows the system to generate music that aligns with the desired emotional tone, whether it's happy, sad, suspenseful, or romantic. As an example, if a user inputs the text "A melancholic rainy day in Paris," the system can analyze the semantic content and generate a musical piece that evokes feelings of melancholy and nostalgia, possibly using a slow tempo, minor key, and instruments associated with Parisian culture, such as an accordion or a piano.

According to the aspect, the system can classify the input text into specific musical genres or styles 703 based on keywords, phrases, or cultural references. By understanding the intended genre or style, the system can generate music that adheres to the characteristic elements and conventions of that particular genre. For example, if the input text mentions "funky bass line" or "soulful groove," the system can infer that the desired music should be in the funk or soul genre. It can then generate a composition that incorporates elements such as syncopated rhythms, prominent bass lines, and brass or organ instrumentation.

The text-to-music capabilities can interpret temporal and rhythmic 704 cues from the input text to generate music with the appropriate pacing, meter, and structure. This includes understanding phrases like "fast-paced," "slow and steady," or "waltz-like" to create music with the corresponding tempo and rhythmic patterns. If the input text describes a "heart-pounding chase scene," for example, the system can generate music with a fast tempo, driving rhythms, and intense orchestration to match the desired level of excitement and urgency.

The system can interpret spatial and environmental descriptions 705 in the input text to generate music that evokes a sense of place or atmosphere. This includes understanding references to specific locations, landscapes, or settings and incorporating appropriate musical elements to create an immersive auditory experience. For example, if the input text mentions "a serene mountain vista" or "a bustling city street," the system can generate music that captures the essence of those environments, using elements such as nature sounds, ambient textures, or urban rhythms to transport the listener to the described location.

The text-to-music capabilities can consider the cultural and historical context 706 mentioned in the input text to generate music that is authentic and respectful to the referenced traditions or eras. This includes understanding cultural references, musical styles, and instrumentation specific to certain regions or time periods. As an example, if the input text describes a "traditional Japanese tea ceremony," the system can generate music that incorporates elements of traditional Japanese music, such as the use of the koto, shakuhachi, or taiko drums, and adheres to the principles of simplicity, tranquility, and harmony associated with the tea ceremony.

The text-to-music process can be iterative, allowing users to provide feedback and make adjustments to the generated music. The system can learn from user preferences and refine its output based on the feedback, creating a personalized and collaborative music generation experience. For example, after generating an initial musical composition based on the input text, the user can provide feedback such as "make it more upbeat" or "add more brass instruments." The system can then modify the composition, accordingly, iterating until the user is satisfied with the result.

By incorporating text-to-music capabilities with temporal, spatial, contextual, and other characteristics, the AI-powered music registry and collaboration system 120 enables users to create musical compositions or elements that are tailored to their specific needs and preferences. This technology opens up new possibilities for creative expression, storytelling, and cross-modal collaboration, allowing users to translate their ideas and emotions into compelling musical experiences.

According to various embodiments, the system can provide suggestion of sounds, generation of backing tracks, and exploration of new sonic possibilities. These capabilities enable artists, producers, and composers to expand their creative horizons, discover new musical ideas, and streamline their production workflows. By leveraging advanced machine learning techniques and vast databases of musical knowledge, the system can offer intelligent suggestions, generate high-quality backing tracks, and help users explore novel sonic territories.

The system can analyze a user's musical preferences, genre interests, and current project context to suggest relevant and inspiring sounds, samples, or presets. By understanding the user's creative intent and the characteristics of their existing work, the system can recommend complementary or contrasting sounds that can elevate the production and spark new ideas. For instance, a film composer working on a tense action scene can input their current musical draft into the system. The system analyzes the composition's key, tempo, and emotional tone, and suggests a collection of percussive hits, atmospheric textures, and pulse-pounding basslines that can enhance the scene's intensity and momentum. The composer can audition these suggestions, tweaking and incorporating them into their work to create a more impactful and immersive soundtrack.

Furthermore, the system can generate high-quality backing tracks based on user-specified parameters such as genre, tempo, key, instrumentation, and mood. By leveraging deep learning models trained on vast datasets of musical compositions and performances, the system can create coherent, structured, and emotionally resonant backing tracks that serve as a solid foundation for the user's creative vision. As an example, a singer-songwriter has a melody and lyric idea but struggles to come up with an accompanying instrumental arrangement. They input their vocal recording and specify the desired genre (e.g., folk-pop), tempo, and emotional tone (e.g., introspective and melancholic). The system generates a backing track featuring fingerpicked acoustic guitar, gentle piano chords, and subtle string swells that perfectly complement the vocalist's delivery and lyrical themes. The artist can then refine and build upon this generated backing track to create a fully realized song.

The system can help users explore new sonic possibilities by suggesting unconventional combinations of sounds, processing techniques, or musical styles. By analyzing the user's existing work and creative preferences, the system can propose experimental ideas that push the boundaries of their comfort zone and encourage them to discover novel and exciting musical directions. For example, an electronic music producer typically works within the confines of the techno genre, characterized by repetitive four-on-the-floor beats and industrial textures. The system analyzes their production style and suggests exploring the integration of organic, world music elements, such as African percussion samples, Middle Eastern string instruments, or South Asian vocal chants. The producer can experiment with these suggestions, blending them with their trademark techno sound to create a fresh and innovative fusion that sets them apart from other artists in the genre.

The system may offer intelligent audio processing and mixing suggestions based on the analysis of the user's project and the characteristics of the individual tracks. By understanding the spectral balance, dynamics, and spatial positioning of each element in the mix, the system can recommend equalization (EQ), compression, reverb, and other processing settings that enhance the clarity, cohesion, and emotional impact of the overall production. As an example, consider a mixing engineer is working on a dense rock track with multiple layers of guitars, bass, drums, and vocals. The system analyzes the frequency content and dynamics of each track and suggests EQ cuts and boosts to prevent masking and ensure each element has its own space in the mix. It also recommends compressor settings to control the dynamics and create a punchy, energetic sound. The engineer can use these suggestions as a starting point, fine-tuning them to taste and creating a polished, professional-sounding mix.

The system can inspire users to explore new creative possibilities by suggesting remix ideas or reinterpretations of their existing works. By analyzing the structure, harmony, and rhythmic elements of a user's composition, the system can propose alternative arrangements, instrument substitutions, or stylistic shifts that give the piece a fresh perspective and open up new avenues for experimentation. A classical pianist, for example, has recorded a solo piano piece in the style of Chopin. The system analyzes the composition and suggests a jazz-inspired reinterpretation, complete with a walking bassline, swung rhythms, and extended harmonies. The pianist can use this suggestion as a creative prompt, adapting their playing style and improvising over the proposed changes to create a unique and captivating jazz rendition of their original piece.

By offering intelligent sound suggestions, generating high-quality backing tracks, and facilitating sonic exploration and experimentation, the AI-powered music registry and collaboration system 120 enables artists, producers, and composers to expand their creative possibilities and push the boundaries of their musical expression. These features streamline the production process, inspire new ideas, and ultimately lead to more innovative, diverse, and emotionally resonant musical works.

According to some embodiments, the AI-powered music registry and collaboration system may be configured for re-computing, arranging, composing, sampling, and reinterpretation of works for different timescales and distribution mechanisms. These features allow artists, producers, and composers to adapt their musical works to various contexts, platforms, and audience preferences, maximizing the impact and reach of their creations. By leveraging advanced algorithms and machine learning techniques, the system can automate and streamline the process of transforming musical content to suit different temporal, spatial, and distribution requirements.

The system may automatically adjust the duration and pacing of a musical work to fit different timescales and contexts. This is particularly useful for adapting music to various media formats, such as advertisements, social media content, or video game soundtracks, where the music needs to conform to specific time constraints or narrative structures. For example, a composer has created a 3-minute cinematic orchestral piece for a film trailer. The system can analyze the composition's structure, identifying key moments, transitions, and emotional peaks. It can then generate multiple versions of the piece, such as a 30-second edit for a TV spot, a 15-second version for an Instagram ad, or a 60-second loop for a menu screen in a video game. The system ensures that each version maintains the essence and impact of the original composition while adapting it to the specific timescale requirements.

The system may recompute and adapt musical works for different spatial audio formats and immersive experiences, such as surround sound, binaural audio, or virtual reality environments. By analyzing the spatial characteristics of the original mix and the target format's specifications, the system can intelligently redistribute and optimize the audio elements to create a compelling and immersive listening experience. As an example, a producer has created a stereo mix of a pop song for regular headphone listening. The system can analyze the mix and generate a binaural version optimized for spatial audio platforms like Google Resonance or Facebook 360. It can place the individual instruments, vocals, and effects in a virtual 3D space, creating a sense of depth, directionality, and immersion that enhances the emotional impact of the song. The system can also adapt the mix for a 5.1 surround sound system, placing the elements in the appropriate channels to create a cinematic and enveloping listening experience.

According to some implementations, the system may reinterpret a musical work in different styles or genres, allowing artists to explore new creative directions and reach diverse audiences. By analyzing the harmonic, melodic, and rhythmic elements of the original composition and the characteristics of the target style or genre, the system can generate new versions that maintain the essence of the original while infusing it with the flavors and conventions of the chosen style. For instance, an electronic dance music (EDM) artist has created a high-energy, synth-driven track in the style of big room house. The system can analyze the track's structure, melody, and chord progression and generate reinterpretations in various styles, such as a laid-back tropical house version, a funky disco-inspired remix, or a stripped-down acoustic ballad. These reinterpretations can help the artist reach new audiences, showcase their versatility, and open up opportunities for cross-genre collaborations and remixes.

The system can facilitate the creation of new works by suggesting and integrating relevant samples, loops, and remixes from its vast library of musical content. By analyzing the characteristics of the user's project and the musical elements in the library, the system can recommend samples that complement or enhance the original composition, sparking new creative ideas and enabling the creation of rich, layered, and diverse musical works. For example, a hip-hop producer is working on a new track and looking for a catchy vocal hook to complement their beats. The system analyzes the track's tempo, key, and style, and suggests a range of vocal samples from its library that match these characteristics. The producer can audition these samples, chopping, pitching, and arranging them to create a memorable and infectious hook that elevates the track. The system can also suggest drum breaks, instrumental loops, or sound effects that add texture, depth, and variety to the production.

According to an embodiment, the system may generate adaptive and interactive musical content for video games, virtual reality experiences, or other interactive media. By analyzing the structure and elements of a composer's work and the requirements of the interactive environment, the system can create dynamic music that responds to user actions, game states, or narrative events in real-time. For instance, a video game composer has created a main theme for an open-world adventure game. The system can analyze the theme's structure, motifs, and emotional arc, and generate adaptive variations that match the game's different environments, player actions, and story beats. It can create a peaceful, ambient version of the theme for exploration, an uplifting and heroic variation for moments of triumph, or a tense and dissonant rendition for combat sequences. The system ensures that the music seamlessly transitions between these variations based on the player's actions and the game's narrative flow, creating an immersive and emotionally engaging gaming experience.

By enabling the re-computing, arranging, composing, sampling, and reinterpretation of works for different timescales and distribution mechanisms, the AI-powered music registry and collaboration system 120 enables artists, producers, and composers to adapt their creations to a wide range of contexts and platforms. These capabilities help maximize the impact, reach, and value of musical works, opening up new creative possibilities and engaging diverse audiences across multiple mediums and distribution channels.

Figure 8:
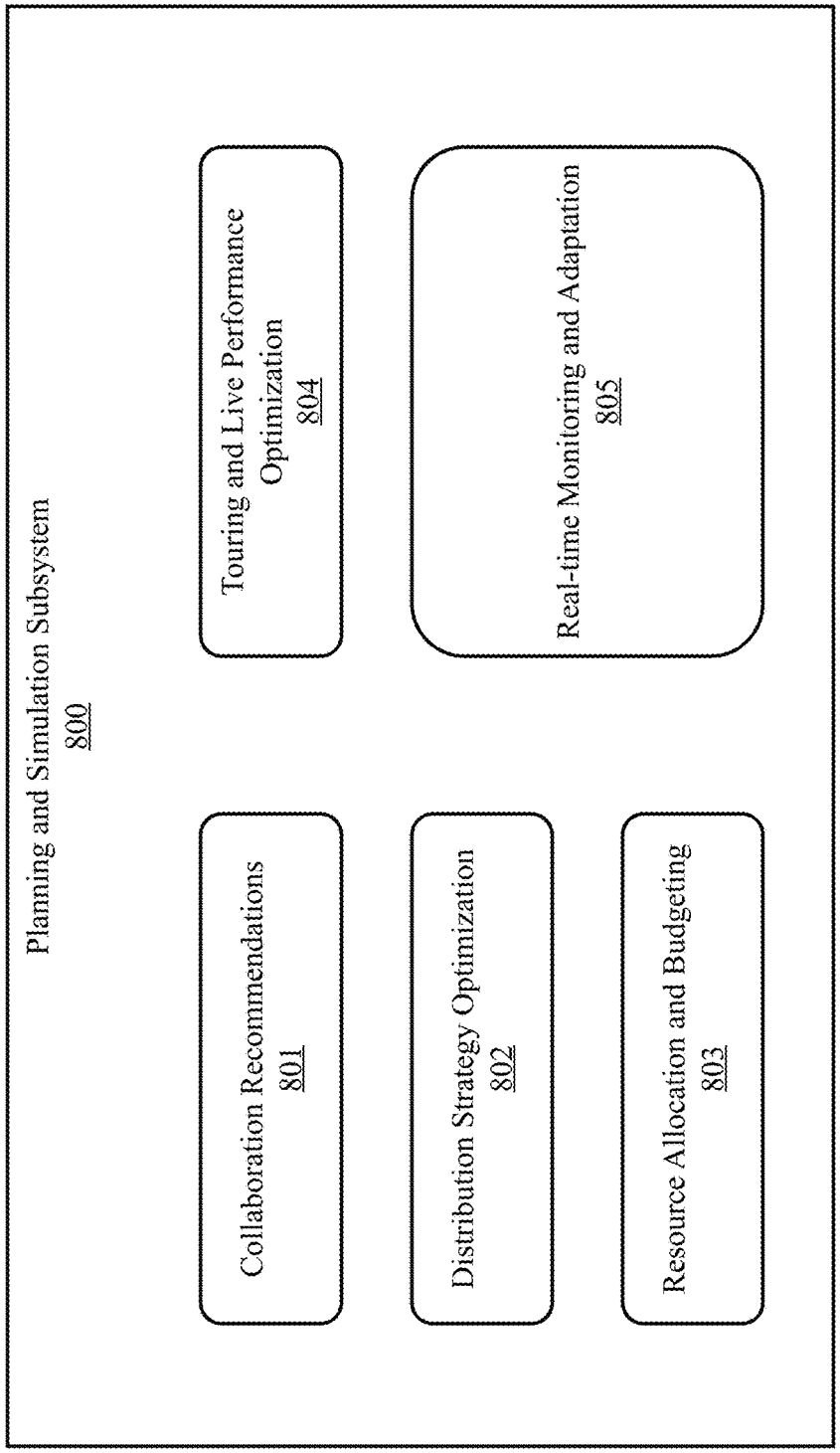
FIG. 8 is a block diagram illustrating an aspect of an artificial intelligence-powered music registry, collaboration, and workflow management system, a planning and simulation subsystem.

FIG. 8 is a block diagram illustrating an aspect of an artificial intelligence-powered music registry, collaboration, and workflow management system, a planning and simulation subsystem 800. According to the aspect, planning and simulation subsystem 800 integrates with planning and simulation tools to help artists and producers make informed decisions about collaborations, distribution strategies, and marketing efforts. By analyzing market trends, audience preferences, and competitor performance, the system can provide data-driven recommendations to optimize resource allocation and maximize the success of a musical project. According to the aspect, text-to-music subsystem 800 comprises a collaboration recommendation component 801, a distribution strategy optimization component 802, a resource allocation and budgeting component 803, a touring and live performance optimization component 804, and a real-time monitoring and adaptation component 805.

According to the aspect, the system can analyze the musical styles, influences, and historical collaborations of artists to recommend potential collaborations that are likely to yield successful and innovative results. By considering factors such as genre compatibility, audience overlap, and creative synergy, the system can suggest collaborations that have a high likelihood of resonating with fans and creating a significant impact. For example, if an electronic music producer is looking for a vocalist to collaborate with, the system can analyze their musical style and recommend vocalists who have previously collaborated with similar producers or whose vocal style complements the producer's sound. The system can also consider the popularity and audience demographics of the potential collaborators to ensure maximum reach and engagement.

The system can optimize the distribution strategy 802 for a musical project by analyzing market trends, audience preferences, and historical performance data. By simulating different distribution scenarios and predicting their outcomes, the system can recommend the most effective combination of platforms, release timings, and promotional activities to maximize the project's reach and revenue potential. When planning the release of a new album, for example, the system can analyze data from previous releases in the same genre or by similar artists to determine the optimal release date, pricing strategy, and distribution channels. The system can also simulate different marketing and promotional scenarios to identify the most cost-effective and impactful activities, such as social media campaigns, music videos, or live performances.

The system can help optimize resource allocation and budgeting 803 decisions for musical projects by analyzing historical data and predicting the expected return on investment (ROI) for different options. By considering factors such as production costs, marketing expenses, and potential revenue streams, the system can recommend the most efficient and effective allocation of resources to maximize the project's profitability and success. As an example, when planning a music video production, the system can analyze data from previous music videos in the same genre or by similar artists to estimate the expected viewership, engagement, and revenue generation. The system can then recommend the optimal budget allocation for different aspects of the production, such as location, casting, visual effects, and promotion, to ensure the best possible ROI.

The system may optimize touring and live performance 804 decisions by analyzing audience demand, venue characteristics, and historical ticket sales data. By simulating different touring scenarios and predicting their financial and logistical outcomes, the system can recommend the most effective routing, venue selection, and ticket pricing strategies to maximize attendance, revenue, and artist satisfaction. For example, when planning a concert tour, the system can analyze data from previous tours by the artist or similar acts to identify the most promising markets, venues, and time periods. The system can also simulate different ticket pricing and promotion strategies to optimize revenue and attendance, while considering factors such as travel costs, production expenses, and artist preferences.

According to the aspect, the system can provide real-time monitoring and adaptive recommendations 805 throughout the lifecycle of a musical project. By continuously analyzing data on audience engagement, sales performance, and market trends, the system can identify opportunities for optimization and suggest adjustments to the project's strategy in real-time. For example, during the first week of an album's release, the system can monitor streaming numbers, social media engagement, and fan feedback to identify which tracks are resonating the most with listeners. Based on this data, the system can recommend adjustments to the promotional strategy, such as focusing on certain tracks or platforms, to capitalize on the album's early success and momentum.

By integrating planning, optimization routines, and simulation modeling into the AI-powered music registry and collaboration system 120, users can make data-driven decisions that maximize the creative, commercial, and operational success of their musical projects. These capabilities empower artists, managers, and labels to navigate the complex and dynamic landscape of the music industry with greater confidence, efficiency, and agility, ultimately fostering a more sustainable and thriving music ecosystem.

Figure 9:
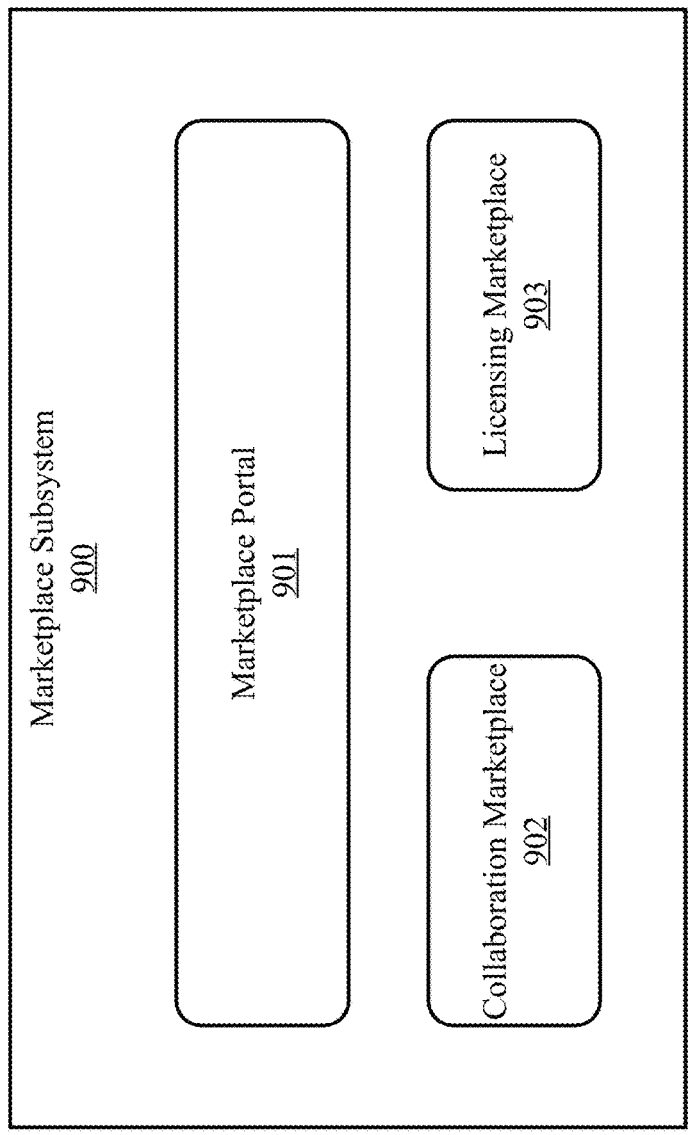
FIG. 9 is a block diagram illustrating an aspect of an artificial intelligence-powered music registry, collaboration, and workflow management system, a marketplace subsystem.

FIG. 9 is a block diagram illustrating an aspect of an artificial intelligence-powered music registry, collaboration, and workflow management system, a marketplace subsystem 900. According to the aspect, marketplace subsystem 900 facilitates the efficient and transparent exchange of creative assets and services between artists, producers, and rights holders. Artists can bid on collaboration opportunities or the rights to remix existing works. This platform facilitates creative partnerships and allows emerging artists to gain exposure by working with established names in the industry. The marketplace also provides a transparent and efficient way to manage the legal and financial aspects of collaborations and remixes. According to the aspect, marketplace subsystem 900 comprises marketplace portal 901, a collaboration marketplace 902, and a licensing marketplace 903.

According to the aspect, a marketplace portal 901 is present and configured to provide a user interface where system users can browse marketplace offerings, upload content to the marketplace, and engage in marketplace transactions.

According to the aspect, the collaboration marketplace 902 allows artists to post their projects or creative needs and invite other artists, producers, or musicians to submit their proposals or bids for collaboration. This can include requests for specific instrumentals, vocals, lyrics, or production services. Artists can specify their budget, timeline, and creative requirements, while potential collaborators can showcase their skills, portfolio, and previous work to attract interest. For example, a hip-hop artist looking for a featured verse on their new track can post a request on the collaboration marketplace, specifying the desired style, theme, and budget. Interested rappers can then submit their proposals, including a sample verse and their creative vision for the collaboration. The artist can review the proposals, negotiate terms, and select the most suitable collaborator for the project.

According to the aspect, the remix licensing marketplace 903 enables artists and rights holders to make their original works available for remixing, sampling, or adaptation by other creators. Artists can specify the terms and conditions under which their work can be licensed, including the permitted uses, royalty rates, and any creative restrictions. Interested remixers or producers can then browse the available works, negotiate the licensing terms, and secure the necessary permissions to create derivative works. For instance, an electronic music producer wants to create a remix of a popular indie rock song. They can search the remix licensing marketplace for the original song, review the licensing terms set by the rights holder, and submit a request to secure the necessary permissions. Once the license is granted, the producer can create their remix, knowing that they have the legal right to use the original work and that the rights holder will be fairly compensated.

The system can facilitate the clearance and licensing of samples used in musical works by connecting artists with the original rights holders and automating the negotiation and payment processes. Artists can identify the samples they want to use, and the system can automatically contact the relevant rights holders, present the proposed terms of use, and handle the licensing transactions securely and efficiently. As an example, a producer wants to use a sample from a classic soul record in their new track. They can use the system to identify the original rights holders, propose the terms of use (e.g., duration, context, and royalty rate), and initiate the licensing process. The system can automate the negotiation, contract generation, and payment, ensuring that all parties are fairly compensated and that the use of the sample is legally compliant.

In some embodiments, the marketplaces can integrate with the system's rights management and revenue sharing capabilities to ensure that all collaborators and rights holders are fairly compensated for their contributions. The system can automatically track the usage and revenue generated by collaborative works, remixes, or licensed samples, and distribute the earnings according to the agreed-upon terms and royalty splits. For example, consider a collaborative track featuring multiple artists is released and generates revenue through streaming, downloads, and sync placements. The system can automatically track the revenue sources, calculate the royalty splits based on the agreed-upon terms, and distribute the earnings to each collaborator's account, providing transparency and fairness in the revenue sharing process.

The marketplaces may incorporate reputation and feedback systems to help artists and rights holders make informed decisions about potential collaborators or licensees. Participants can rate and review their experiences working with others, providing valuable insights into their professionalism, creativity, and reliability. This information can help build trust and foster long-term collaborative relationships within the creative community. For instance, an artist receives multiple collaboration proposals for a project and wants to select the most reliable and skilled collaborator. They can review the feedback and ratings provided by previous collaborators, assess the quality of their work samples, and make an informed decision based on the collective experiences of the creative community.

By incorporating bid-type and licensing marketplaces into the AI-powered music registry and collaboration system 120, artists and rights holders can unlock new creative and commercial opportunities, while ensuring that all parties are fairly compensated and recognized for their contributions. These marketplaces foster a more open, efficient, and equitable music ecosystem, where creativity can flourish, and collaborations can thrive.

Figure 10:
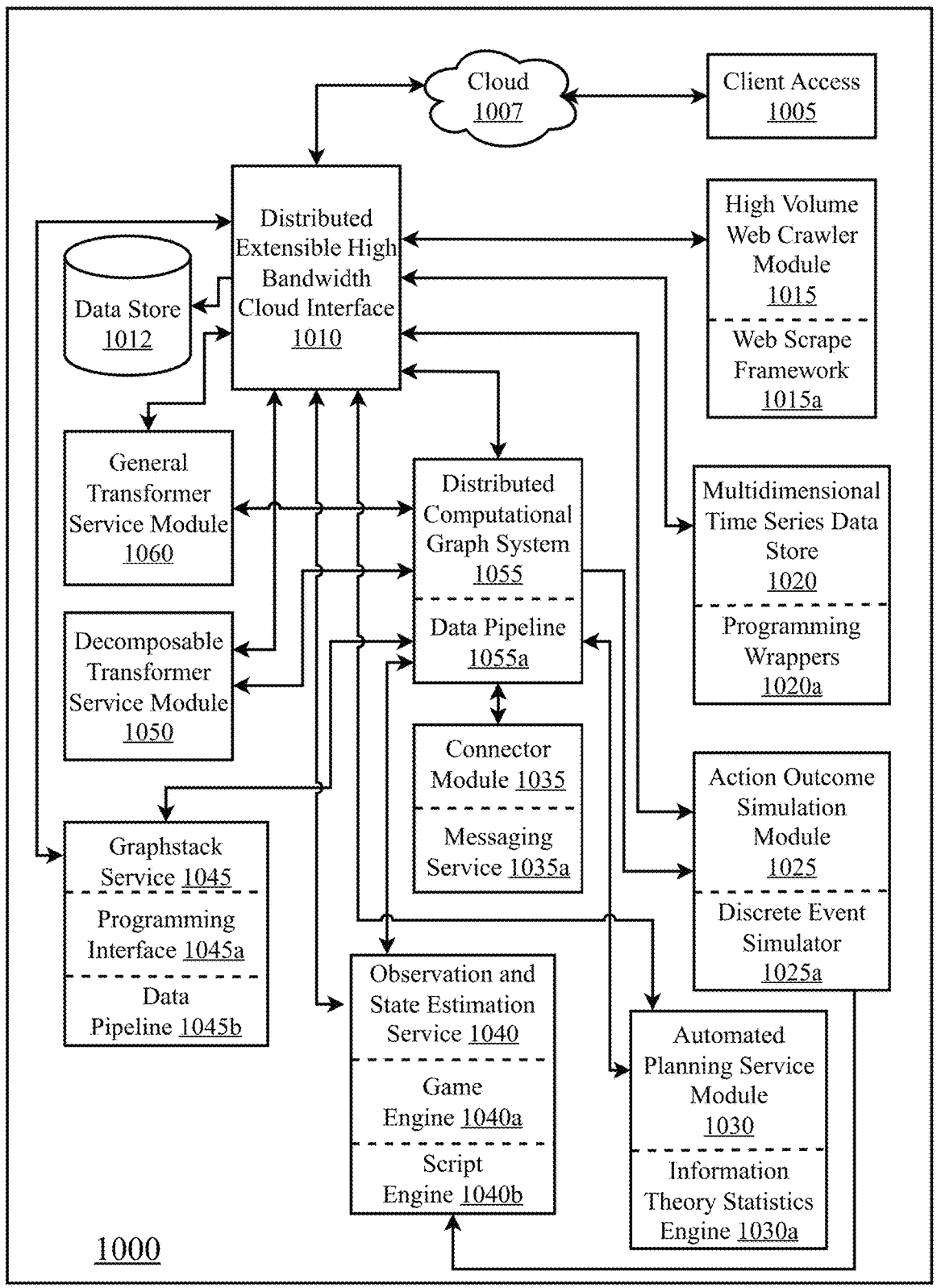
FIG. 10 is a block diagram illustrating an exemplary aspect of an embodiment of a distributed computational graph computing system utilizing an advanced cyber decision platform (ACDP) for external network reconnaissance and contextual data collection.

FIG. 10 is a block diagram illustrating an exemplary aspect of an embodiment of a distributed computational graph computing system utilizing an advanced cyber decision platform (ACDP) for external network reconnaissance and contextual data collection. Client access to the system 1005 for specific data entry, system control and for interaction with system output such as automated predictive decision making and planning and alternate pathway simulations, occurs through the system's distributed, extensible high bandwidth cloud interface 1010 which uses a versatile, robust web application driven interface for both input and display of client-facing information via network 1007 and operates a data store 1012 such as, but not limited to MONGODB™, COUCHDB™, CASSANDRA™ or REDIS™ according to various arrangements. Much of the enterprise knowledge/context data analyzed by the system both from sources within the confines of the enterprise business, and from cloud based sources, also enter the system through the cloud interface 1010, data being passed to the connector module 1035 which may possess the API routines 1035a needed to accept and convert the external data and then pass the normalized information to other analysis and transformation components of the system, the directed computational graph module 1055, high volume web crawler module 1015, multidimensional time series database (MDTSDB) 1020 and the graph stack service 1045. The directed computational graph module 1055 retrieves one or more streams of data from a plurality of sources, which includes, but is in no way not limited to, enterprise knowledge, RAGs, expert judgment/scores, a plurality of physical sensors, network service providers, web based questionnaires and surveys, monitoring of electronic infrastructure, crowdsourcing campaigns, and human input device information. Within the directed computational graph module 1055, data may be split into two identical streams in a specialized pre-programmed data pipeline 1055a, wherein one sub-stream may be sent for batch processing and storage while the other sub-stream may be reformatted for transformation pipeline analysis. The data is then transferred to the general transformer service module 1060 for linear data transformation as part of analysis or the decomposable transformer service module 1050 for branching or iterative transformations that are part of analysis. The directed computational graph module 1055 can represent all data as directed graphs where the transformations are nodes and the result messages between transformations edges of the graph. The high volume web crawling module 1015 uses multiple server hosted preprogrammed web spiders, which while autonomously configured are deployed within a web scraping framework 1015a of which SCRAPY™ is an example, to identify and retrieve data of interest from web based sources that are not well tagged by conventional web crawling technology. Data persistence stores such as the multiple dimension time series data store module 1020 may receive streaming data from a large plurality of sensors that may be of several different types. The multiple dimension time series data store module may also store any time series data encountered by the system such as but not limited to enterprise network usage data, component and system logs, environmental context, edge device state information, performance data, network service information captures such as, but not limited to news and financial feeds, and sales and service related customer data. The module is designed to accommodate irregular and high volume surges by dynamically allocating network bandwidth and server processing channels to process the incoming data. Inclusion of programming wrappers 1020a for languages examples of which are, but not limited to C++, PERL, PYTHON, Rust, GoLang, and ERLANG™ allows sophisticated programming logic to be added to the default function of the multidimensional time series database 1020 without intimate knowledge of the core programming, greatly extending breadth of function. Data retrieved by various data stores such as SQL, graph, key-value, or the multidimensional time series database (MDTSDB) 1020 and the high volume web crawling module 1015 may be further analyzed and transformed into task optimized results by the directed computational graph 1055 and associated general transformer service 1050 and decomposable transformer service 1060 modules. Alternately, data from the multidimensional time series database and high volume web crawling modules may be sent, often with scripted cuing information determining important vertexes 1045a, to the graph stack service module 1045 which, employing standardized protocols for converting streams of information into graph representations of that data, for example, open graph internet technology although the invention is not reliant on any one standard. Through the steps, the graph stack service module 1045 represents data in graphical form influenced by any predetermined scripted modifications 1045a and stores it in a graph-based data store 1045b such as GIRAPH™ or a key value pair type data store REDIS™, or RIAK™, among others, all of which are suitable for storing graph-based information.

Results of the transformative analysis process may then be combined with further client directives, and additional business rules and practices relevant to the analysis and situational information external to the already available data in the automated planning service module 1030 which also runs powerful information theory 1030a based predictive statistics functions and machine learning algorithms to allow future trends and outcomes to be rapidly forecast based upon the current system derived results and choosing each a plurality of possible business decisions. Using all available data, the automated planning service module 1030 may propose business decisions most likely to result in the most favorable business outcome with a usably high level of certainty. Closely related to the automated planning service module in the use of system derived results in conjunction with possible externally supplied additional information (i.e., context) in the assistance of end user business decision making, the action outcome simulation module 1025 with its discrete event simulator programming module 1025*a* coupled with the end user facing observation and state estimation service 1040 which is highly scriptable 1040*b* as circumstances require and has a game engine 1040*a* to more realistically stage possible outcomes of business decisions under consideration, allows business decision makers to investigate the probable outcomes of choosing one pending course of action over another based upon analysis of the current available data.

Figure 11:
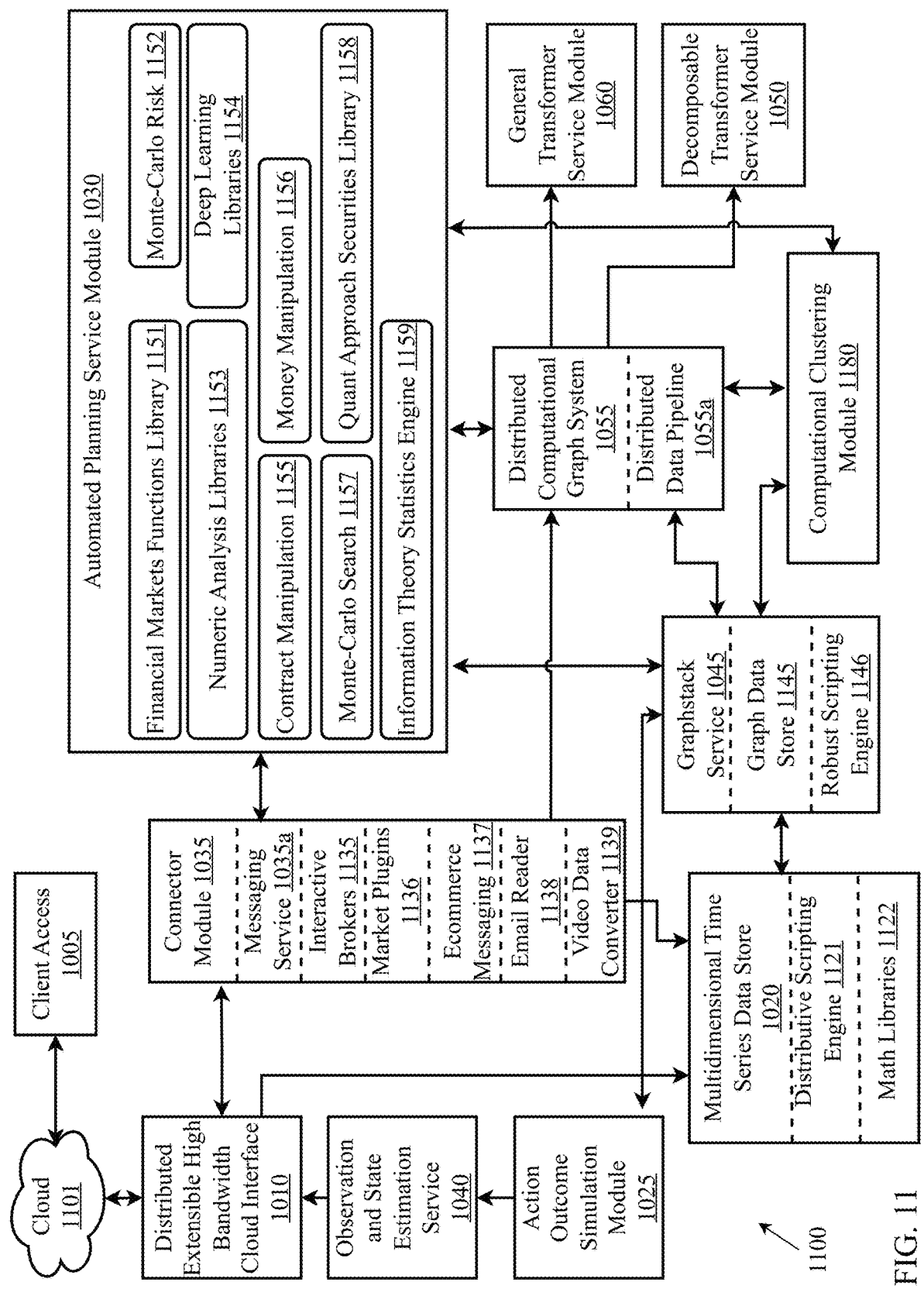
FIG. 11 is a block diagram illustrating another exemplary aspect of an embodiment of a distributed computational graph computing systems utilizing an advanced cyber decision platform.

FIG. 11 is a block diagram illustrating another exemplary aspect of an embodiment 1100 of a distributed computational graph computing systems utilizing an advanced cyber decision platform. According to the aspect the integrated platform 1100, is very well suited to perform advanced predictive analytics and predictive simulations to produce investment predictions. Much of the trading specific programming functions are added to the automated planning service module 1030 of the modified advanced cyber decision platform 1100 to specialize it to perform trading analytics. Specialized purpose libraries may include but are not limited to financial markets functions libraries 1151, Monte-Carlo risk routines 1152, numeric analysis libraries 1153, deep learning libraries 1154, contract manipulation functions 1155, money handling functions 1156, Monte-Carlo search libraries 1157, and quant approach securities routines 1158. Pre-existing deep learning routines including information theory statistics engine 1159 may also be used. The invention may also make use of other libraries and capabilities that are known to those skilled in the art as instrumental in the regulated trade of items of worth. Data from a plurality of sources used in trade analysis are retrieved, much of it from remote, cloud resident 1101 servers through the system's distributed, extensible high bandwidth cloud interface 110 using the system's connector module 135 which is specifically designed to accept data from a number of information services both public and private through interfaces to those service's applications using its messaging service 135*a* routines, due to case of programming, are augmented with interactive broker functions 1135, market data source plugins 1136, e-commerce messaging interpreters 1137, business-practice aware email reader 1138 and programming libraries to extract information from video data sources 1139.

Other modules that make up the advanced cyber decision platform may also perform significant analytical transformations on trade related data. These may include the multidimensional time series data store 1020 with its robust scripting features which may include a distributive friendly, fault-tolerant, real-time, continuous run prioritizing, programming platform such as, but not limited to Erlang/OTP 1121 and a compatible but comprehensive and proven library of math functions of which the C++ math libraries are an example 1122, data formalization and ability to capture time series data including irregularly transmitted, burst data; the GraphStack service 145 which transforms data into graphical representations for relational analysis and may use packages for graph format data storage such as Titan 1145 or the like and a highly interface accessible programming interface an example of which may be Akka/Spray, although other, similar, combinations may equally serve the same purpose in this role 1146 to facilitate optimal data handling; the directed computational graph module 155 and its distributed data pipeline 155*a* supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 1005 in formats best suited to convey both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 1025. Data and simulation formatting may be completed or performed by the observation and state estimation service 1040 using its case of scripting and gaming engine to produce optimal presentation results.

In cases where there are both large amounts of data to be ingested, schematized, normalized, semantified or otherwise cleansed, enriched or formalized and then intricate transformations such as those that may be associated with deep machine learning, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 1180 to allow the configuration and management of such clusters during application of the advanced cyber decision platform. While the computational clustering module is drawn directly connected to specific co-modules of the advanced cyber decision platform these connections, while logical, are for case of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Detailed Description of Exemplary Aspects

Figure 12:
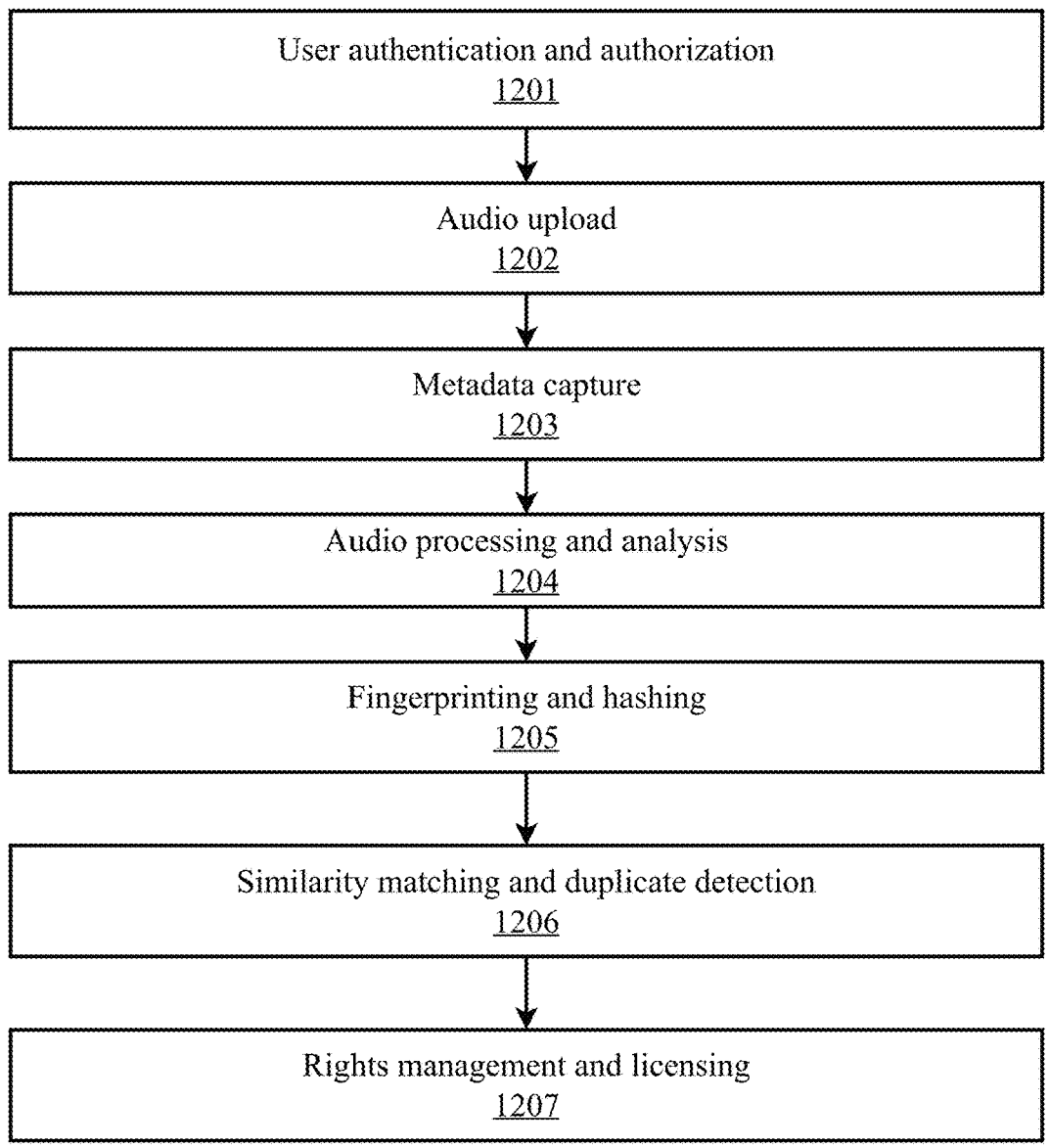
FIG. 12 is a flow diagram illustrating an exemplary workflow when a user uploads a musical piece to the music registry and collaboration system, according to an embodiment.

FIG. 12 is a flow diagram illustrating an exemplary workflow 1200 when a user uploads a musical piece to the music registry and collaboration system, according to an embodiment. According to the embodiment, the process starts at step 1201 with user authentication and authorization. The user logs into the system using their credentials (e.g., username and password) or through a third-party authentication provider (e.g., Google, Facebook). The system verifies the user's identity and permissions to ensure they have the necessary rights to upload and manage musical content. At step 1202 the user uploads their audio data. The user selects the audio file they want to upload to the system. The file can be in various formats such as MP3, WAV, or AIFF. The system validates the audio file to ensure it meets the required quality standards and file format specifications.

If the file is valid, the system initiates the upload process and stores the audio file in a secure and scalable storage system, such as, for example, Amazon S3 or Google Cloud Storage.

At step 1203 the system captures metadata associated with the uploaded audio data. During the upload process, the user may be prompted to provide metadata associated with the musical piece, such as the title, artist name, album, genre, release year, and any additional tags or descriptions. In some implementations, the system may be configured to scan the Internet for available metadata. The system may also automatically extract metadata from the audio file, such as ID3 tags or embedded information. The user can review and edit the metadata to ensure accuracy and completeness. At step 1204, once the audio file is uploaded, the system initiates a series of audio processing and analysis tasks. This may include tasks such as audio normalization, trimming, format conversion, and feature extraction. The system may also apply machine learning algorithms to analyze the audio content, such as genre classification, mood detection, or instrument recognition.

At step 1205 the system generates a unique audio fingerprint for the uploaded musical piece using algorithms like Shazam's fingerprinting or Chromaprint. The fingerprint is then hashed using a secure cryptographic hash function, such as SHA-256, to create a compact and unique identifier for the audio content. The hashed fingerprint is stored in the system's database along with the associated metadata. At step 1206 the system performs similarity matching and duplicate detection. The system can compare the hashed fingerprint of the newly uploaded musical piece against the existing database of fingerprints. It uses similarity matching algorithms, such as locality-sensitive hashing (LSH) or nearest neighbor search, to identify any potential duplicates or highly similar pieces. If a duplicate or similar piece is found, the system may prompt the user to confirm the upload and/or provide additional information to differentiate the new piece from existing ones.

As a last step 1207, the system performs actions directed to rights management and licensing. The user specifies the rights and licensing information associated with the uploaded musical piece. This may include details such as copyright ownership, distribution permissions, and any applicable licenses or restrictions. The system stores this information securely and associates it with the specific musical piece.

Figure 13:
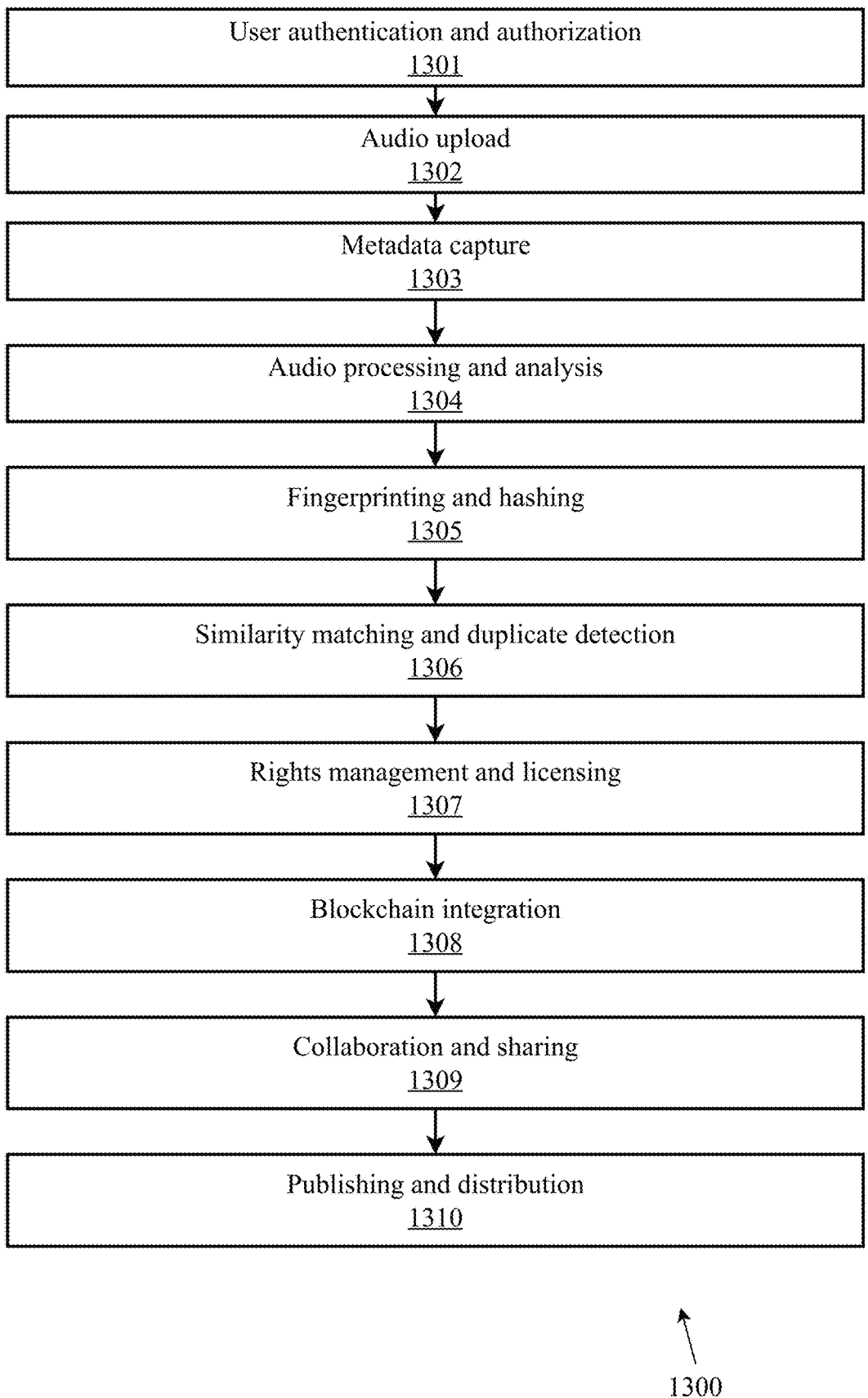
FIG. 13 is a flow diagram illustrating another exemplary workflow when a user uploads a musical piece to the music registry and collaboration system, according to an embodiment.

FIG. 13 is a flow diagram illustrating another exemplary workflow 1300 when a user uploads a musical piece to the music registry and collaboration system, according to an embodiment. This general workflow provides an overview of the key steps involved when a user uploads a musical piece to the music registry and collaboration system. The specific implementation details and additional features may vary depending on the system's architecture, design choices, and business requirements.

According to the embodiment, the process starts at step 1301 with user authentication and authorization. The user logs into the system using their credentials (e.g., username and password) or through a third-party authentication provider (e.g., Google, Facebook). The system verifies the user's identity and permissions to ensure they have the necessary rights to upload and manage musical content. At step 1302 the user uploads their audio data. The user selects the audio file they want to upload to the system. The file can be in various formats such as MP3, WAV, or AIFF. The system validates the audio file to ensure it meets the required quality standards and file format specifications. If the file is valid, the system initiates the upload process and stores the audio file in a secure and scalable storage system, such as, for example, Amazon S3 or Google Cloud Storage.

At step 1303 the system captures metadata associated with the uploaded audio data. During the upload process, the user may be prompted to provide metadata associated with the musical piece, such as the title, artist name, album, genre, release year, and any additional tags or descriptions. In some implementations, the system may be configured to scan the Internet for available metadata. The system may also automatically extract metadata from the audio file, such as ID3 tags or embedded information. The user can review and edit the metadata to ensure accuracy and completeness. At step 1304, once the audio file is uploaded, the system initiates a series of audio processing and analysis tasks. This may include tasks such as audio normalization, trimming, format conversion, and feature extraction. The system may also apply machine learning algorithms to analyze the audio content, such as genre classification, mood detection, or instrument recognition.

At step 1305 the system generates a unique audio fingerprint for the uploaded musical piece using algorithms like Shazam's fingerprinting or Chromaprint. The fingerprint is then hashed using a secure cryptographic hash function, such as SHA-256, to create a compact and unique identifier for the audio content. The hashed fingerprint is stored in the system's database along with the associated metadata. At step 1306 the system performs similarity matching and duplicate detection. The system can compare the hashed fingerprint of the newly uploaded musical piece against the existing database of fingerprints. It uses similarity matching algorithms, such as locality-sensitive hashing (LSH) or nearest neighbor search, to identify any potential duplicates or highly similar pieces. If a duplicate or similar piece is found, the system may prompt the user to confirm the upload and/or provide additional information to differentiate the new piece from existing ones.

At step 1307, the system performs actions directed to rights management and licensing. The user specifies the rights and licensing information associated with the uploaded musical piece. This may include details such as copyright ownership, distribution permissions, and any applicable licenses or restrictions. The system stores this information securely and associates it with the specific musical piece. At step 1308 the system integrates with a blockchain network, such as Ethereum or Hyperledger, to record the metadata, rights information, and hashed fingerprint of the uploaded musical piece. The blockchain provides an immutable and transparent ledger for tracking the ownership, provenance, and licensing history of the musical piece.

If the user chooses to enable collaboration or sharing features, the system allows them to invite other users to contribute to or access the uploaded musical piece at step 1309. Collaborators can be assigned specific roles and permissions, such as the ability to edit metadata, provide feedback, or remix the piece. The system can track and record all collaborative activities and modifications made to the musical piece. Once the musical piece is uploaded, processed, and all necessary information is captured, the user can choose to publish and distribute the piece through the system's platform or integrated distribution channels at step 1310. The system may offer options for monetization, such as setting a price for downloads or enabling streaming through partner platforms. The system ensures that the published piece adheres to the specified rights and licensing terms and tracks usage and revenue data for reporting and royalty distribution.

Figure 14:
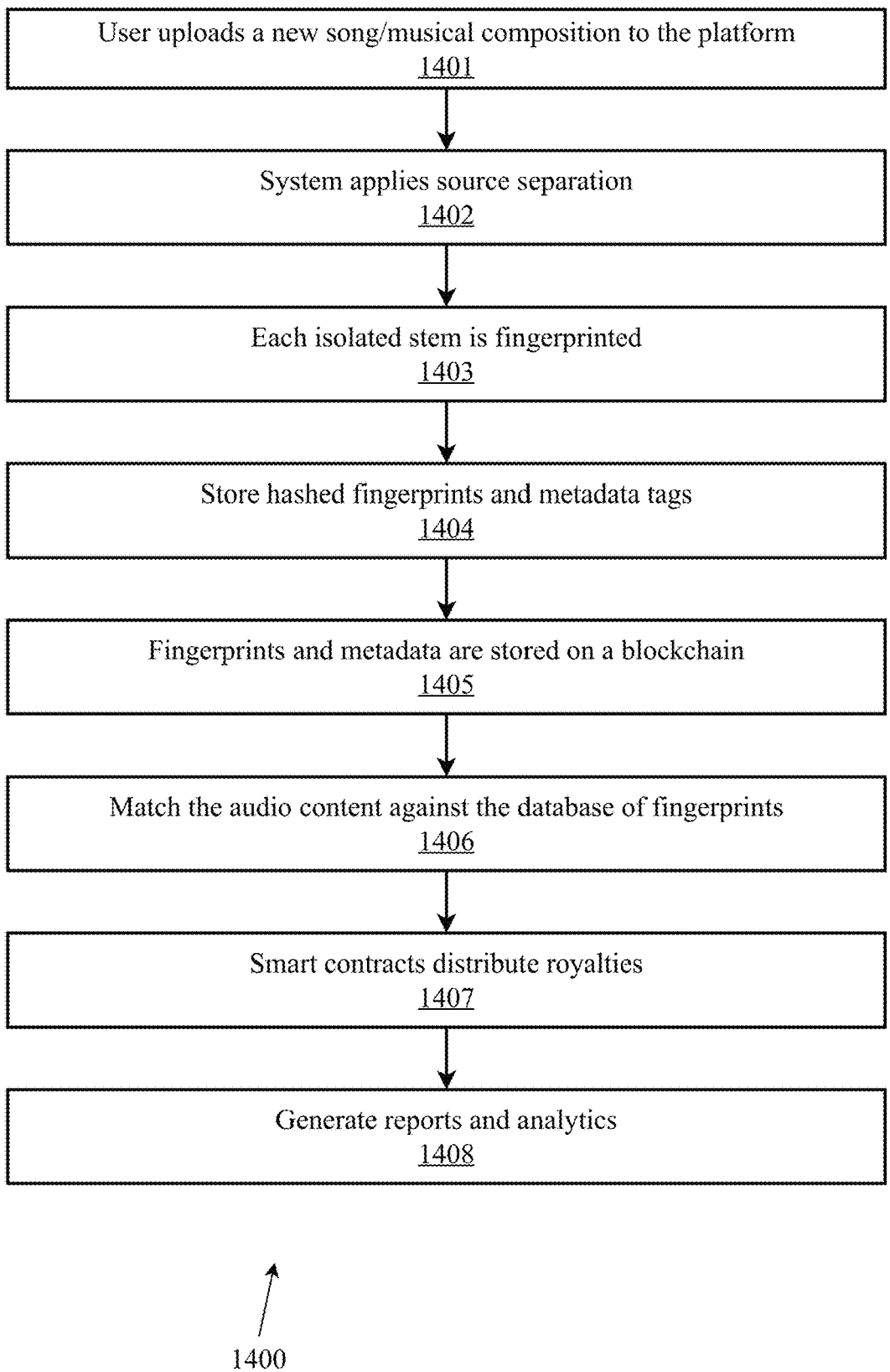
FIG. 14 is a flow diagram illustrating an exemplary method for segmenting and hashing instruments, vocals, and other elements of a music composition to enhance crediting and royalty distribution, according to an embodiment.

FIG. 14 is a flow diagram illustrating an exemplary method 1400 for segmenting and hashing instruments, vocals, and other elements of a music composition to enhance crediting and royalty distribution, according to an embodiment. At step 1401 a user (e.g., producer, song writer, etc.) uploads a new song or musical composition to the platform. At step 1402 the system applies source separation (e.g., Deep Extractor, Spleeter) to isolate the vocals, drums, bass, and guitar stems. At step 1403 each isolated stem is fingerprinted using an algorithm (e.g., Shazam's algorithm) and hashed using a secure cryptographic hashing algorithm, for example SHA-256. The hashed fingerprints are stored in a database, along with metadata tags indicating, for example, the instrument type, performer name, and time range within the song at step 1404. At step 1405 the metadata and fingerprints may also be recorded on a blockchain network for immutable and transparent tracking of ownership and licensing information.

When a song is streamed or downloaded, the system can match the audio content against the database of fingerprints to identify the usage of each segmented component at step 1406. At step 1407 the blockchain smart contracts automatically distribute the royalties to the respective contributors based on the predefined splits and licensing terms. As a last step 1408 the system generates reports and analytics showing the popularity and usage metrics for each musical element, providing valuable insights to the rights holders.

By implementing these processes for segmenting and hashing instruments, vocals, and other elements of a music composition, the AI-powered music registry and collaboration platform can enable more granular and accurate crediting and royalty distribution. This empowers musicians, producers, and rights holders to have greater control over their creative contributions and ensures fair compensation for their work.

Figure 15:
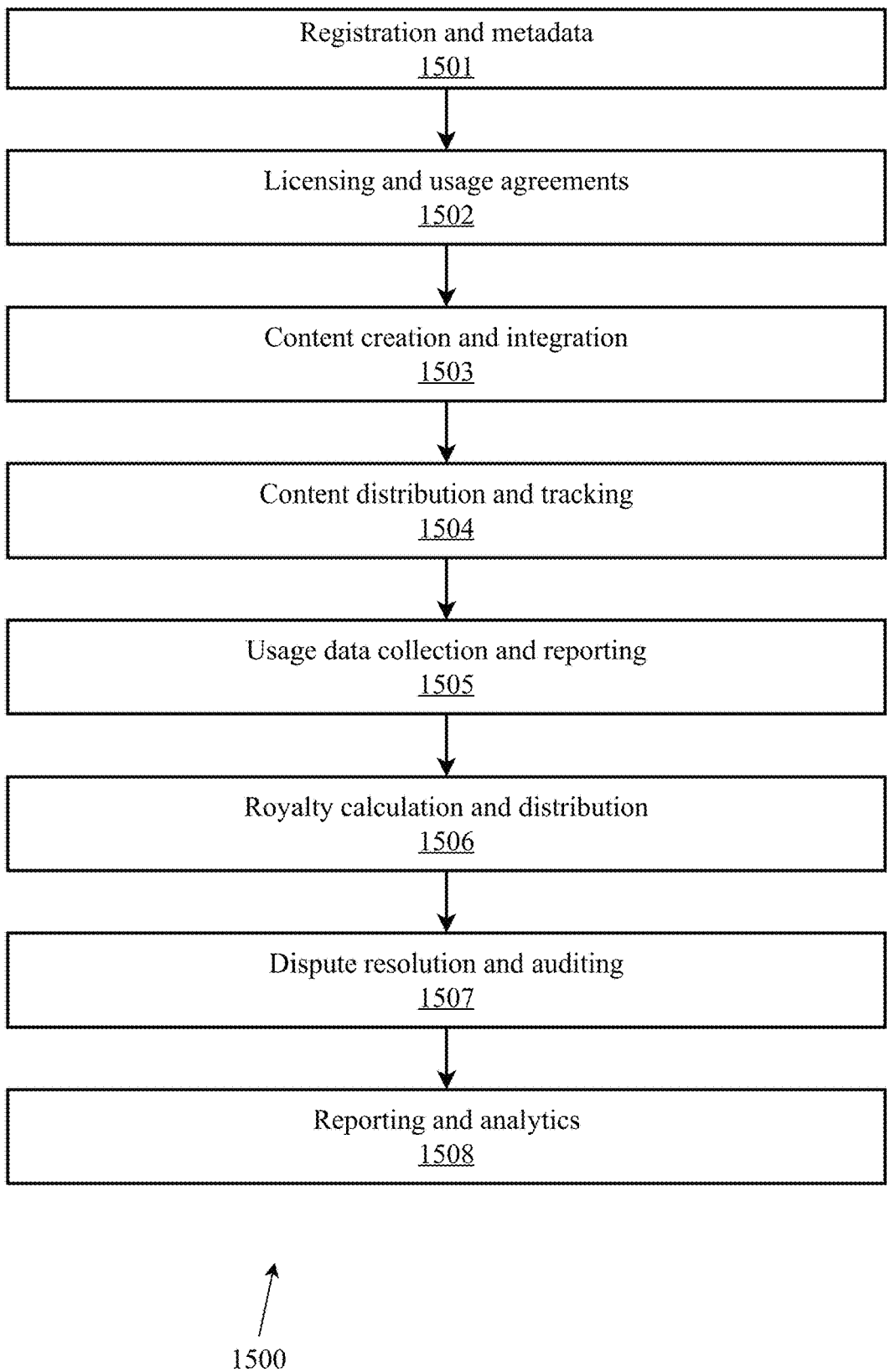
FIG. 15 is a flow diagram illustrating an exemplary method for tracking musical component usage and distributing royalties based on licensing and/or usage agreements, according to an embodiment.

FIG. 15 is a flow diagram illustrating an exemplary method 1500 for tracking musical component usage and distributing royalties based on licensing and/or usage agreements, according to an embodiment. According to the embodiment, the process begins at step 1501 when rights holders (e.g., artists, producers, publishers, etc.) register their musical components (e.g., songs, stems, samples, etc.) in the system 120. They can provide detailed metadata for each component, including title, creator(s), ownership splits, and licensing terms. The system may assign a unique identifier to each registered component. At step 1502 licenses (e.g., music services, content creators) browse and discover musical components in the system. The licensees can negotiate and enter into licensing agreements with the rights holders for the usage of specific components. The licensing agreements specify the terms of use, such as duration, territory, media, and royalty rates. The system records these agreements and associates them with the respective musical components.

At step 1503, licensees integrate the licensed musical components into their content (e.g., songs, videos, advertisements, etc.). They provide the system with information about the content, including the usage of the licensed components. The system tracks the usage of each component within the content. At step 1504, the content containing the licensed musical components is distributed through various channels (e.g., streaming platforms 113, social media 114, broadcasts/traditional media 112). The system can integrate with these distribution channels to track the usage and consumption of the content. It captures data such as the number of plays, views, downloads, and any other relevant metrics. The system collects and aggregates the usage data from the distribution channels at step 1505. It generates usage reports for each musical component, showing the total usage and breakdowns by content, platform, and territory. The usage reports are made available to the rights holders for transparency and verification.

Based on the usage data and the licensing agreements, the system calculates the royalties owed to each rights holder at step 1506. It may consider factors such as the agreed-upon royalty rates, usage metrics, and any applicable deductions or fees. The system can generate royalty statements detailing the earnings for each musical component. It initiates the distribution of royalties to the rights holders according to the specified payment terms and methods. In case of any discrepancies or disputes regarding the usage data or royalty calculations, the system may provide a mechanism for resolution at step 1507. Rights holders can raise queries or disputes through the system, providing supporting evidence if necessary. The system facilitates communication between the parties involved and assists in resolving the issues. It maintains an audit trail of all transactions, usage data, and royalty calculations for accountability and transparency.

At step 1508, the system generates comprehensive reports and analytics for rights holders and licensees. Rights holders can access insights into the usage and performance of their musical components across different content and platforms. Licensees can track the effectiveness and ROI of their licensed components and make informed decisions for future licensing. The system provides data visualization tools and customizable reporting features to cater to different stakeholders' needs.

The system 120 may be configured to continuously monitor the usage and performance of the licensed musical components. It identifies trends, anomalies, and opportunities for optimization. The system can provide recommendations to rights holders and licensees based on the data insights. It may suggest potential licensing opportunities, revenue optimization strategies, and areas for improvement. This workflow ensures that musical component usage is accurately tracked, royalties are calculated fairly, and rights holders are compensated according to the licensing agreements. The system automates the process, reduces manual effort, and provides transparency and accountability for all parties involved.

Exemplary Computing Environment

Figure 16:
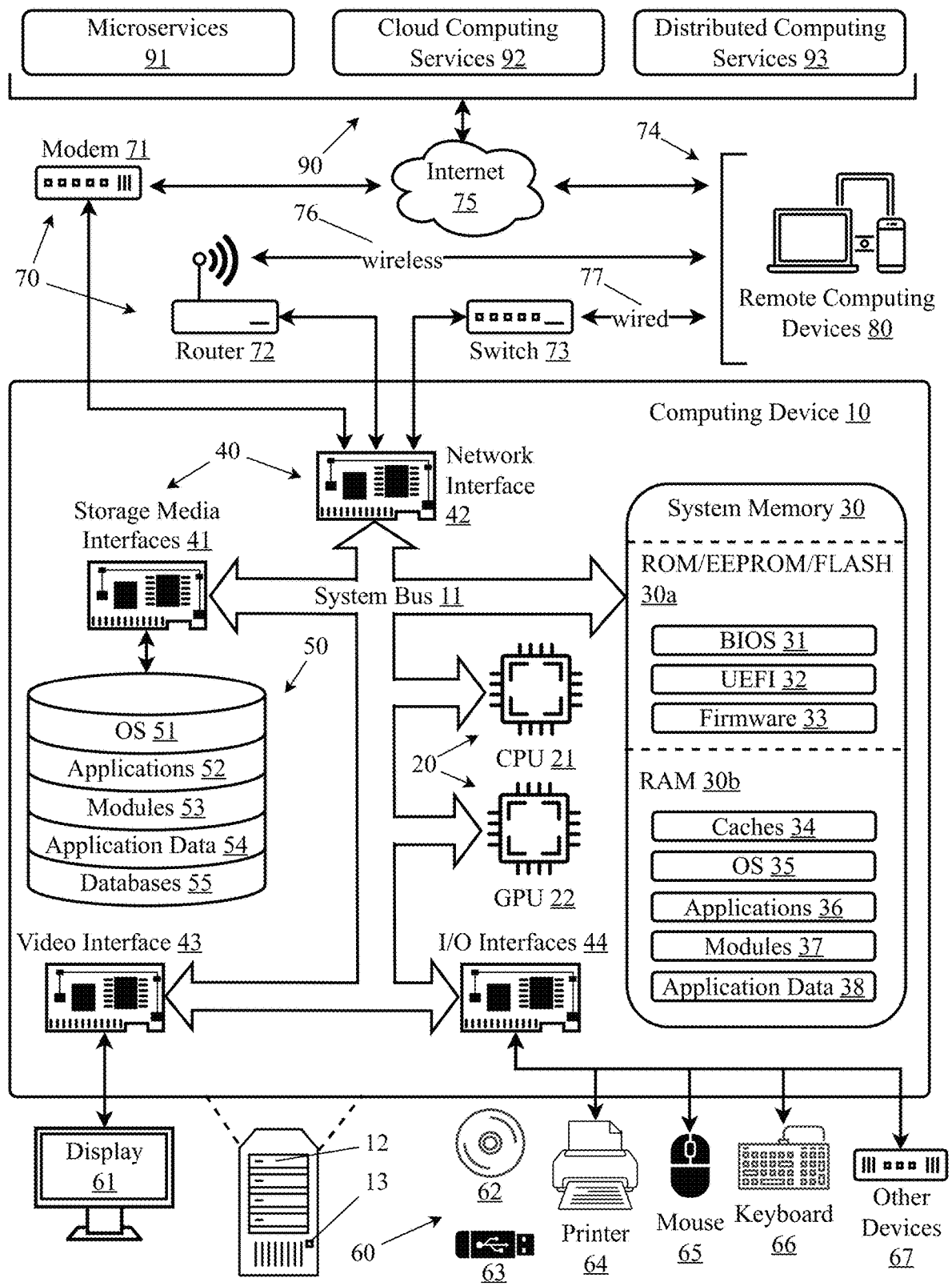
FIG. 16 illustrates an exemplary computing environment on which an embodiment described herein may be implemented.

FIG. 16 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like CISC or RISC. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, and graph databases.

Applications (also known as computer software or software applications) are sets of programming instructions designed to perform specific tasks or provide specific functionality on a computer or other computing devices. Applications are typically written in high-level programming languages such as C++, Java, Scala, Rust, Go, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for managing digital content and associated rights employing an AI-powered content registry and collaboration platform, the computing system comprising:
   one or more hardware processors configured for:
   receiving digital content comprising one or more files, metadata, and rights management information;
   parsing the digital content to isolate individual components using one or more artificial intelligence (AI) systems;
   generating unique identifiers for each isolated component, wherein generating the unique identifiers comprises: generating a fingerprint of each isolated component using fingerprinting techniques, and generating the unique identifier by generating hashes based on each fingerprint of each isolated component using hashing techniques;
   analyzing the digital content and its components using AI and machine learning techniques to extract features, characteristics, and contextual information;
   storing the digital content, isolated components, identifiers, and extracted features, characteristics, and contextual information in a distributed database system;
   storing the generated fingerprints of each isolated component along with the metadata and rights management information on a blockchain;
   enabling collaboration among users by allowing them to contribute, modify, and interact with the digital content and its components;
   managing rights, licenses, and royalty distributions by matching fingerprints of a utilized digital content item that to fingerprints stored on the blockchain, and automatically distributing royalties for the utilized digital content by executing a smart contract on the blockchain;
   tracking usage, performance metrics, and revenue data for the digital content and its components;
   generating reports, insights, and recommendations based on the collected data and analytics; and
   providing a user interface for searching, discovering, and interacting with the digital content and its components within the content registry and collaboration platform.

2. The computing system of claim 1, wherein the digital content comprises musical compositions, and the isolated components include instruments, vocals, and other elements of the musical compositions.

3. The computing system of claim 1, wherein the AI systems used for parsing the digital content include convolutional neural networks (CNNs), recurrent neural networks (RNNs), and generative adversarial networks (GANs).

4. The computing system of claim 1, wherein the fingerprinting and hashing techniques used for generating unique identifiers include audio fingerprinting algorithms and cryptographic hash functions.

5. The computing system of claim 1, wherein the distributed database system comprises a combination of relational databases, NoSQL databases, vector databases, and graph databases.

6. The computing system of claim 1, wherein the collaboration among users includes features such as commenting, version control, and real-time editing of the digital content and its components.

7. The computing system of claim 1, wherein the tracking of usage, performance metrics, and revenue data is performed by integrating with various distribution channels and platforms.

8. The computing system of claim 1, wherein the reports, insights, and recommendations generated by the system include data visualizations, trend analysis, and predictive analytics.

9. The computing system of claim 1, wherein the user interface provides functionalities such as search, filtering, tagging, and personalized recommendations for exploring the digital content and its components.

10. A computer-implemented method executed on an AI-powered content registry and collaboration platform for managing digital content and associated rights, the computer-implemented method comprising:
   receiving digital content comprising one or more files, metadata, and rights management information;
   parsing the digital content to isolate individual components using one or more artificial intelligence (AI) systems;
   generating unique identifiers for each isolated component, wherein generating the unique identifiers comprises: generating a fingerprint of each isolated component using fingerprinting techniques, and generating the unique identifier by generating hashes based on each fingerprint of each isolated component using hashing techniques;
   analyzing the digital content and its components using AI and machine learning techniques to extract features, characteristics, and contextual information;
   storing the digital content, isolated components, identifiers, and extracted features, characteristics, and contextual information in a distributed database system;
   storing the generated fingerprints of each isolated component along with the metadata and rights management information on a blockchain;
   enabling collaboration among users by allowing them to contribute, modify, and interact with the digital content and its components;

managing rights, licenses, and royalty distributions by matching fingerprints of a utilized digital content item that to fingerprints stored on the blockchain, and automatically distributing royalties for the utilized digital content by executing a smart contract on the blockchain;

tracking usage, performance metrics, and revenue data for the digital content and its components;

generating reports, insights, and recommendations based on the collected data and analytics; and providing a user interface for searching, discovering, and interacting with the digital content and its components within the content registry and collaboration platform.

11. The computer-implemented method of claim 10, wherein the digital content comprises musical compositions, and the isolated components include instruments, vocals, and other elements of the musical compositions.

12. The computer-implemented method of claim 10, wherein the AI systems used for parsing the digital content include convolutional neural networks (CNNs), recurrent neural networks (RNNs), and generative adversarial networks (GANs).

13. The computer-implemented method of claim 10, wherein the fingerprinting and hashing techniques used for generating unique identifiers include audio fingerprinting algorithms and cryptographic hash functions.

14. The computer-implemented method of claim 10, wherein the distributed database system comprises a combination of relational databases, NoSQL databases, vector databases, and graph databases.

15. The computer-implemented method of claim 10, wherein the collaboration among users includes features such as commenting, version control, and real-time editing of the digital content and its components.

16. The computer-implemented method of claim 10, wherein the tracking of usage, performance metrics, and revenue data is performed by integrating with various distribution channels and platforms.

17. The computer-implemented method of claim 10, wherein the reports, insights, and recommendations generated by the system include data visualizations, trend analysis, and predictive analytics.

18. The computer-implemented method of claim 10, wherein the user interface provides functionalities such as search, filtering, tagging, and personalized recommendations for exploring the digital content and its components.

19. A system for managing digital content and associated rights employing an Al-powered content registry and collaboration platform, comprising one or more computers with executable instruction that, when executed, cause the system to:

receive digital content comprising one or more files, metadata, and rights management information;

parse the digital content to isolate individual components using one or more artificial intelligence (AI) systems;

generate unique identifiers for each isolated component, wherein generating the unique identifiers comprises: generating a fingerprint of each isolated component using fingerprinting techniques, and generating the unique identifier by generating hashes based on each fingerprint of each isolated component using hashing techniques;

analyze the digital content and its components using AI and machine learning techniques to extract features, characteristics, and contextual information;

store the digital content, isolated components, identifiers, and extracted features, characteristics, and contextual information in a distributed database system;

enable collaboration among users by allowing them to contribute, modify, and interact with the digital content and its components;

manage rights, licenses, and royalty distributions by matching fingerprints of a utilized digital content item that to fingerprints stored on the blockchain, and automatically distributing royalties for the utilized digital content by executing a smart contract on the blockchain;

track usage, performance metrics, and revenue data for the digital content and its components;

generate reports, insights, and recommendations based on the collected data and analytics; and provide a user interface for searching, discovering, and interacting with the digital content and its components within the content registry and collaboration platform.

20. The system of claim 19, wherein the digital content comprises musical compositions, and the isolated components include instruments, vocals, and other elements of the musical compositions.

21. The system of claim 19, wherein the AI systems used for parsing the digital content include convolutional neural networks (CNNs), recurrent neural networks (RNNs), and generative adversarial networks (GANs).

22. The system of claim 19, wherein the fingerprinting and hashing techniques used for generating unique identifiers include audio fingerprinting algorithms and cryptographic hash functions.

23. The system of claim 19, wherein the distributed database system comprises a combination of relational databases, NoSQL databases, vector databases, and graph databases.

24. The system of claim 19, wherein the collaboration among users includes features such as commenting, version control, and real-time editing of the digital content and its components.

25. The system of claim 19, wherein the tracking of usage, performance metrics, and revenue data is performed by integrating with various distribution channels and platforms.

26. The system of claim 19, wherein the reports, insights, and recommendations generated by the system include data visualizations, trend analysis, and predictive analytics.

27. The system of claim 19, wherein the user interface provides functionalities such as search, filtering, tagging, and personalized recommendations for exploring the digital content and its components.

28. Non-transitory, computer-readable storage media having computer executable instruction embodied thereon that, when executed by one or more processors of a computing system employing an Al-powered content registry and collaboration platform for managing digital content and associated rights, cause the computing system to:

receive digital content comprising one or more files, metadata, and rights management information;

parse the digital content to isolate individual components using one or more artificial intelligence (AI) systems;

generate unique identifiers for each isolated component, wherein generating the unique identifiers comprises: generating a fingerprint of each isolated component using fingerprinting techniques, and generating the unique identifier by generating hashes based on each fingerprint of each isolated component using hashing techniques;

analyze the digital content and its components using AI and machine learning techniques to extract features, characteristics, and contextual information;

store the digital content, isolated components, identifiers, and extracted features, characteristics, and contextual information in a distributed database system;

enable collaboration among users by allowing them to contribute, modify, and interact with the digital content and its components;

manage rights, licenses, and royalty distributions by matching fingerprints of a utilized digital content item that to fingerprints stored on the blockchain, and automatically distributing royalties for the utilized digital content by executing a smart contract on the blockchain;

track usage, performance metrics, and revenue data for the digital content and its components;

generate reports, insights, and recommendations based on the collected data and analytics; and provide a user interface for searching, discovering, and interacting with the digital content and its components within the content registry and collaboration platform.

29. The non-transitory, computer-readable storage media of claim 28, wherein the digital content comprises musical compositions, and the isolated components include instruments, vocals, and other elements of the musical compositions.

30. The non-transitory, computer-readable storage media of claim 28, wherein the AI systems used for parsing the digital content include convolutional neural networks (CNNs), recurrent neural networks (RNNs), and generative adversarial networks (GANs).

31. The system of claim 28, wherein the fingerprinting and hashing techniques used for generating unique identifiers include audio fingerprinting algorithms and cryptographic hash functions.

32. The non-transitory, computer-readable storage media of claim 28, wherein the distributed database system comprises a combination of relational databases, NoSQL databases, vector databases, and graph databases.

33. The non-transitory, computer-readable storage media of claim 28, wherein the collaboration among users includes features such as commenting, version control, and real-time editing of the digital content and its components.

34. The non-transitory, computer-readable storage media of claim 28, wherein the tracking of usage, performance metrics, and revenue data is performed by integrating with various distribution channels and platforms.

35. The non-transitory, computer-readable storage media of claim 28, wherein the reports, insights, and recommendations generated by the system include data visualizations, trend analysis, and predictive analytics.

36. The non-transitory, computer-readable storage media of claim 28, wherein the user interface provides functionalities such as search, filtering, tagging, and personalized recommendations for exploring the digital content and its components.

* * * * *